(12) United States Patent
Lee et al.

(10) Patent No.: US 12,362,409 B2
(45) Date of Patent: *Jul. 15, 2025

(54) BATTERY MODULE

(71) Applicant: SAMSUNG SDI CO., LTD., Yongin-si (KR)

(72) Inventors: Junhyung Lee, Yongin-si (KR); Sungyong Kim, Yongin-si (KR); Jaeho Kim, Yongin-si (KR); Soodeok Moon, Yongin-si (KR); Daeyeop Park, Yongin-si (KR); Jangwoong Bae, Yongin-si (KR); Dooyong Lim, Yongin-si (KR); Jisoon Lim, Yongin-si (KR); Eungi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,797

(22) Filed: Mar. 20, 2023

(65) Prior Publication Data

US 2023/0231217 A1    Jul. 20, 2023

Related U.S. Application Data

(63) Continuation of application No. 16/656,324, filed on Oct. 17, 2019, now Pat. No. 11,626,630.

(30) Foreign Application Priority Data

Oct. 19, 2018    (KR) .......................... 10-2018-0125550

(51) Int. Cl.
*H01M 10/613*    (2014.01)
*H01M 10/647*    (2014.01)
(Continued)

(52) U.S. Cl.
CPC ....... *H01M 10/613* (2015.04); *H01M 10/647* (2015.04); *H01M 50/20* (2021.01);
(Continued)

(58) Field of Classification Search
CPC .. H01M 10/613; H01M 10/647; H01M 50/20; H01M 50/209; H01M 50/242;
(Continued)

(56) References Cited

U.S. PATENT DOCUMENTS 6,146,778 A    11/2000 Rouillard et al.
6,255,015 B1    7/2001 Corrigan et al.
(Continued)

FOREIGN PATENT DOCUMENTS

CN    1324499 A    11/2001
CN    1592977 A    3/2005
(Continued)

OTHER PUBLICATIONS

Chinese Notice of Allowance dated Jun. 15, 2022, issued in Chinese Patent Application No. 201910989841.2 (7 pages).
(Continued)

*Primary Examiner* — Michael L Dignan
(74) *Attorney, Agent, or Firm* — Womble Bond Dickinson (US) LLP

(57) ABSTRACT

A battery module includes: a cell stack including a plurality of unit cells arranged in a first direction; and an insulating member around the plurality of unit cells; a plurality of module housings, each of the module housings including a plurality of receiving parts and receiving the cell stack; and a coupling part, and each of the receiving parts includes a fixing wall around the cell stack and having at least a portion which is in contact with the cell stack, and the fixing wall includes end walls at respective sides of each of the receiving parts in the first direction to engage end surfaces of
(Continued)

respective sides of the cell stack in the first direction, and the coupling part is configured to be coupled to the coupling part of an adjacent battery module.

14 Claims, 12 Drawing Sheets

(51) Int. Cl.
*H01M 50/20* (2021.01)
*H01M 50/209* (2021.01)
*H01M 50/242* (2021.01)
*H01M 50/262* (2021.01)
*H01M 50/289* (2021.01)
H01M 10/62 (2014.01)
H01M 10/625 (2014.01)
H01M 50/505 (2021.01)

(52) U.S. Cl.
CPC ....... *H01M 50/209* (2021.01); *H01M 50/242* (2021.01); *H01M 50/262* (2021.01); *H01M 50/289* (2021.01); H01M 10/62 (2015.04); H01M 10/625 (2015.04); H01M 50/505 (2021.01)

(58) Field of Classification Search
CPC .. H01M 50/262; H01M 50/289; H01M 10/62; H01M 10/625; H01M 50/505; H01M 2220/20; H01M 10/0481; H01M 50/103; H01M 50/258; H01M 10/6554; H01M 10/6568; H01M 10/6556; H01M 10/6567; Y02E 60/10; Y02P 70/50
See application file for complete search history.

(56) References Cited

U.S. PATENT DOCUMENTS

| | | | |
|---|---|---|---|
| 6,555,264 B1 | 4/2003 | Hamada et al. | |
| 6,864,013 B2 | 3/2005 | Gow et al. | |
| 2005/0079408 A1* | 4/2005 | Hirano | H01M 10/613 429/174 |
| 2005/0255379 A1 | 11/2005 | Marchio et al. | |
| 2007/0005371 A1* | 1/2007 | Nakagawa | G06F 3/167 704/E15.04 |
| 2007/0054561 A1* | 3/2007 | Gutman | H01M 50/516 439/656 |
| 2007/0087266 A1 | 4/2007 | Bourke et al. | |
| 2010/0009251 A1 | 1/2010 | Shin et al. | |
| 2010/0266887 A1 | 10/2010 | Sekino et al. | |
| 2010/0285347 A1 | 11/2010 | Saito et al. | |
| 2011/0076521 A1* | 3/2011 | Shimizu | H01M 50/529 429/82 |
| 2011/0165451 A1 | 7/2011 | Kim et al. | |
| 2011/0300433 A1 | 12/2011 | Kim | |
| 2012/0103714 A1 | 5/2012 | Choi et al. | |
| 2012/0115013 A1 | 5/2012 | Kim et al. | |
| 2012/0177970 A1* | 7/2012 | Marchio | H01M 50/103 429/120 |
| 2013/0045403 A1 | 2/2013 | Shin et al. | |
| 2013/0089763 A1* | 4/2013 | Lee | H01M 50/271 429/82 |
| 2013/0207459 A1 | 8/2013 | Schröder et al. | |
| 2013/0260195 A1 | 10/2013 | Long | |
| 2014/0087221 A1 | 3/2014 | Kim et al. | |
| 2014/0141311 A1 | 5/2014 | Michelitsch | |
| 2014/0234690 A1 | 8/2014 | Lee et al. | |
| 2014/0353057 A1 | 12/2014 | Adachi | |
| 2015/0042158 A1 | 2/2015 | Schmidt et al. | |
| 2015/0072178 A1 | 3/2015 | Gu | |
| 2015/0086831 A1* | 3/2015 | Haussmann | H01M 10/625 429/120 |
| 2015/0229010 A1 | 8/2015 | Ahn | |
| 2015/0357617 A1 | 12/2015 | Okada | |
| 2016/0028056 A1 | 1/2016 | Lee et al. | |
| 2016/0056427 A1 | 2/2016 | Kim et al. | |
| 2016/0118635 A1 | 4/2016 | Keller et al. | |
| 2016/0164054 A1 | 6/2016 | Yamamoto et al. | |
| 2016/0233464 A1 | 8/2016 | Nusier et al. | |
| 2016/0233468 A1 | 8/2016 | Nusier et al. | |
| 2016/0268657 A1 | 9/2016 | Park et al. | |
| 2017/0062783 A1 | 3/2017 | Kim et al. | |
| 2017/0062789 A1 | 3/2017 | Sim et al. | |
| 2017/0133706 A1 | 5/2017 | Ejima | |
| 2017/0222200 A1 | 8/2017 | Murai et al. | |
| 2017/0263910 A1 | 9/2017 | Kobayashi et al. | |
| 2017/0365888 A1 | 12/2017 | Kwon et al. | |
| 2018/0013111 A1 | 1/2018 | Wuensche et al. | |
| 2018/0026243 A1 | 1/2018 | Stojanovic et al. | |
| 2018/0102576 A1 | 4/2018 | Yamamoto et al. | |
| 2018/0109016 A1 | 4/2018 | Fees et al. | |
| 2018/0123200 A1 | 5/2018 | Golubkov | |
| 2018/0138466 A1 | 5/2018 | Fees et al. | |
| 2018/0138473 A1 | 5/2018 | Bessho et al. | |
| 2018/0138560 A1 | 5/2018 | Bessho | |
| 2018/0175466 A1 | 6/2018 | Seo et al. | |
| 2018/0269443 A1 | 9/2018 | Takahashi et al. | |
| 2018/0294452 A1 | 10/2018 | Tan et al. | |
| 2018/0331402 A1 | 11/2018 | Inoue | |
| 2018/0337374 A1* | 11/2018 | Matecki | B60K 1/04 |
| 2019/0001838 A1 | 1/2019 | Choi et al. | |
| 2019/0088911 A1 | 3/2019 | Peng et al. | |
| 2019/0123318 A1* | 4/2019 | Fees | H01M 50/51 |
| 2019/0198845 A1 | 6/2019 | Bae et al. | |
| 2019/0221817 A1 | 7/2019 | Jeon | |
| 2019/0296294 A1 | 9/2019 | Hirschbeck et al. | |
| 2019/0305273 A1 | 10/2019 | Long et al. | |
| 2019/0348725 A1 | 11/2019 | Golubkov | |
| 2020/0006824 A1 | 1/2020 | Lim | |
| 2020/0067155 A1 | 2/2020 | Hwang et al. | |
| 2020/0127258 A1 | 4/2020 | Lim et al. | |
| 2020/0313128 A1 | 10/2020 | Schnakenberg | |
| 2021/0143505 A1 | 5/2021 | Hidaka | |

FOREIGN PATENT DOCUMENTS

| | | |
|---|---|---|
| CN | 102117930 A | 7/2011 |
| CN | 102270754 A | 12/2011 |
| CN | 102934254 A | 2/2013 |
| CN | 103035975 A | 4/2013 |
| CN | 103380511 A | 10/2013 |
| CN | 103890997 A | 6/2014 |
| CN | 104137294 A | 11/2014 |
| CN | 104617244 A | 5/2015 |
| CN | 104835980 A | 8/2015 |
| CN | 104904033 A | 9/2015 |
| CN | 104995760 A | 10/2015 |
| CN | 105552261 A | 5/2016 |
| CN | 105870370 A | 8/2016 |
| CN | 205768594 U | 12/2016 |
| CN | 106299176 A | 1/2017 |
| CN | 106486622 A | 3/2017 |
| CN | 106797005 A | 5/2017 |
| CN | 206210887 U | 5/2017 |
| CN | 206584990 U | 10/2017 |
| CN | 107528019 A | 12/2017 |
| CN | 107591500 A | 1/2018 |
| CN | 107644960 A | 1/2018 |
| CN | 107658401 A | 2/2018 |
| CN | 207199697 U | 4/2018 |
| CN | 207398218 U | 5/2018 |
| CN | 108365156 A | 8/2018 |
| CN | 108463902 A | 8/2018 |
| CN | 207690855 U | 8/2018 |
| CN | 207818706 U | 9/2018 |
| CN | 108630851 A | 10/2018 |
| CN | 210628373 U | 5/2020 |
| EP | 2450990 A2 | 5/2012 |
| EP | 2 608 309 A1 | 6/2013 |
| EP | 3 273 500 A1 | 1/2018 |
| EP | 3267507 A1 | 1/2018 |
| EP | 3 316 340 A1 | 5/2018 |

(56) References Cited

FOREIGN PATENT DOCUMENTS

| | | |
|---|---|---|
| EP | 3 327 817 A1 | 5/2018 |
| JP | 2003-249202 A | 9/2003 |
| JP | 2004-171856 A | 6/2004 |
| JP | 3906706 B2 | 4/2007 |
| JP | 2009-231042 A | 10/2009 |
| JP | 2013-008521 A | 1/2013 |
| JP | 2017-37754 A | 2/2017 |
| JP | 6095813 B2 | 3/2017 |
| JP | 6117308 B2 | 4/2017 |
| JP | 6224321 B2 | 11/2017 |
| JP | 2018-073551 A | 5/2018 |
| KR | 10-2010-0055477 A | 5/2010 |
| KR | 10-2013-0001381 A | 1/2013 |
| KR | 10-2013-0078933 A | 7/2013 |
| KR | 10-2013-0113740 A | 10/2013 |
| KR | 10-2015-0029371 A | 3/2015 |
| KR | 10-1584295 B1 | 1/2016 |
| KR | 10-2016-0037542 A | 4/2016 |
| KR | 10-2017-0011212 A | 2/2017 |
| KR | 10-2017-0025074 A | 3/2017 |
| KR | 10-2017-0053429 A | 5/2017 |
| KR | 10-2018-0010989 A | 1/2018 |
| KR | 10-2018-0045840 A | 5/2018 |
| KR | 10-2018-0054382 A | 5/2018 |
| KR | 10-2018-0060997 A | 6/2018 |
| KR | 10-2019-0079367 A | 7/2019 |
| WO | WO 00/11730 A1 | 3/2000 |
| WO | WO 2007/027603 A2 | 3/2007 |
| WO | WO 2016/166972 A1 | 10/2016 |
| WO | WO 2017/132575 A1 | 8/2017 |
| WO | WO 2017/203911 A1 | 11/2017 |
| WO | WO 2017/220515 A1 | 12/2017 |
| WO | WO 2018/016816 A1 | 1/2018 |
| WO | WO 2018/062869 A1 | 4/2018 |
| WO | WO 2018/105981 A1 | 6/2018 |
| WO | WO 2018/142809 A1 | 8/2018 |

OTHER PUBLICATIONS

Chinese Notice of Allowance, with English translation, dated Jul. 25, 2022, issued in Chinese Patent Application No. 201910988354.4 (6 pages).
Chinese Notice of Allowance, with English translation, dated Nov. 4, 2022, issued in corresponding Chinese Patent Application No. 201910990468.2 (6 pages).
Chinese Office action dated Jun. 15, 2022, issued in Chinese Patent Application No. 201910988939.6 (9 pages).
Chinese Office action, with English translation, dated Aug. 3, 2022, issued in Chinese Patent Application No. 201910990468.2 (27 pages).
Chinese Office Action, with English translation, dated Dec. 2, 2021, issued in Chinese Patent Application No. 201910988939.6 (22 pages).
Chinese Office Action, with English translation, dated Dec. 21, 2021, issued in corresponding Chinese Patent Application No. 201910989914.8 (18 pages).
Chinese Office Action, with English translation, dated Dec. 23, 2021, issued in corresponding Chinese Patent Application No. 201910990468.2 (15 pages).
Chinese Office Action, with English translation, dated Dec. 24, 2021, issued in Chinese Patent Application No. 201910988354.4 (21 pages).
Chinese Office Action, with English translation, dated Dec. 28, 2021, issued in Chinese Patent Application No. 201910989841.2 (16 pages).
Chinese Office Action, with English translation, dated Dec. 3, 2021, issued in corresponding Chinese Patent Application No. 201910989674.1 (23 pages).
Chinese Office action, with English translation, dated Jul. 22, 2022, issued in Chinese Patent Application No. 201910989674.1 (19 pages).

EPO Extended Search Report dated Mar. 4, 2020 for corresponding European Patent Application No. 19203926.1 (7 pages).
EPO Office action dated Aug. 5, 2022, issued in European Patent Application No. 19203939.4 (4 pages).
EPO Office action dated Jul. 26, 2022, issued in European Patent Application No. 19203930.3 (5 pages).
EPO Office action dated Sep. 1, 2022, issued in European Patent Application No. 19203935.2 (4 pages).
Extended European Search Report for corresponding European Patent Application No. 19203933.7, dated Feb. 20, 2020, 10 pages.
Extended European Search Report for corresponding European Patent Application No. 19203930.3, dated Feb. 24, 2020, 6 pages.
Extended European Search Report for corresponding European Patent Application No. 19203917.0, dated Feb. 24, 2020, 7 pages.
Extended European Search Report for corresponding European Patent Application No. 19203935.2, dated Feb. 24, 2020, 9 pages.
Extended European Search Report for corresponding European Patent Application No. 19203939.4, dated Feb. 28, 2020, 10 pages.
U.S. Advisory Action from U.S. Appl. No. 16/655,889, dated Feb. 10, 2022, 3 pages.
U.S. Final Office action dated Dec. 17, 2021, issued in U.S. Appl. No. 16/655,889 (8 pages).
U.S. Notice of Allowance dated Aug. 11, 2022, issued in U.S. Appl. No. 16/655,889 (8 pages).
U.S. Notice of Allowance dated Aug. 17, 2022, issued in U.S. Appl. No. 16/656,406 (5 pages).
U.S. Notice of Allowance dated Jul. 25, 2022, issued in U.S. Appl. No. 16/656,099 (9 pages).
U.S. Notice of Allowance dated Nov. 16, 2021, issued in U.S. Appl. No. 16/656,099 (9 pages).
U.S. Notice of Allowance from U.S. Appl. No. 16/655,889 dated Apr. 18, 2022, 8 pages.
U.S. Notice of Allowance from U.S. Appl. No. 16/656,099, dated Mar. 9, 2022, 9 pages.
U.S. Office action dated Jul. 7, 2021, issued in U.S. Appl. No. 16/656,099 (9 pages).
U.S. Office action dated Jun. 28, 2021, issued in U.S. Appl. No. 16/655,889 (9 pages).
U.S. Office action dated Nov. 29, 2021, issued in U.S. Appl. No. 16/656,190 (15 pages).
U.S. Office action dated Oct. 26, 2021, issued in U.S. Appl. No. 16/656,197 (11 pages).
U.S. Office action dated Sep. 1, 2021, issued in U.S. Appl. No. 16/656,406 (10 pages).
U.S. Office action dated Sep. 23, 2022, issued in U.S. Appl. No. 16/656,190 (22 pages).
U.S. Office action from U.S. Appl. No. 16/656,190, dated May 19, 2022, 17 pages.
U.S. Office action from U.S. Appl. No. 16/656,197 dated Apr. 27, 2022, 20 pages.
U.S. Office action from U.S. Appl. No. 16/656,406 dated May 4, 2022, 9 pages.
U.S. Office Action from U.S. Appl. No. 16/656,406, dated Feb. 25, 2022, 9 pages.
US Notice of Allowance dated Dec. 7, 2022, issued in U.S. Appl. No. 16/656,406 (5 pages).
US Notice of Allowance dated Nov. 22, 2022, issued in U.S. Appl. No. 16/656,099 (9 pages).
US Office action dated Feb. 7, 2023, issued in U.S. Appl. No. 16/655,889 (8 pages).
US Office action dated Sep. 29, 2022, issued in U.S. Appl. No. 16/656,197 (14 pages).
US Final Office Action dated Mar. 20, 2023, issued in U.S. Appl. No. 16/656,190 (20 pages).
US Final Office Action dated Mar. 23, 2023, issued in U.S. Appl. No. 16/656,197 (13 pages).
EPO Extended European Search Report dated May 2, 2023, issued in European Patent Application No. 23150872.2 (7 pages).
Korean Office Action dated May 31, 2023, issued in Korean Patent Application No. 10-2018-0125549 (6 pages).
Korean Office Action dated Jun. 20, 2023, issued in Korean Patent Application No. 10-2018-0125553 (6 pages).

(56) References Cited

OTHER PUBLICATIONS

Korean Office Action dated Jun. 20, 2023, issued in Korean Patent Application No. 10-2018-0125552 (5 pages).
Korean Office Action dated Jun. 20, 2023, issued in Korean Patent Application No. 10-2018-0125551 (6 pages).
Korean Office Action dated Jun. 20, 2023, issued in Korean Patent Application No. 10-2018-0125550 (7 pages).
US Office Action dated Jul. 11, 2023, issued in U.S. Appl. No. 18/184,637 (6 pages).
Chinese Notice of Allowance, with English translation, dated Jul. 10, 2023, issued in Chinese Patent Application No. 201910989674.1 (9 pages).
US Office Action dated Jul. 12, 2024, issued in U.S. Appl. No. 18/525,059 (10 pages).
US Office Action dated Sep. 12, 2024, issued in U.S. Appl. No. 18/589,415 (6 pages).
US Final Office Action dated Jan. 6, 2025, issued in U.S. Appl. No. 18/525,059 (10 pages).
EPO Extended European Search Report dated Mar. 27, 2025, issued in corresponding European Patent Application No. 23194224.4, 8 pages.

* cited by examiner

BATTERY MODULE

CROSS-REFERENCE TO RELATED APPLICATIONS

This application is a continuation of U.S. patent application Ser. No. 16/656,324, filed on Oct. 17, 2019, and claims priority to and the benefit of Korean Patent Application No. 10-2018-0125550 filed in the Korean Intellectual Property Office on Oct. 19, 2018, the entire contents of which are incorporated herein by reference, and incorporates, in their entirety, by reference application Ser. Nos. 16/656,197, 16/656,190, 16/655,889, 16/656,406, and 16/656,099, filed on Oct. 17, 2019.

BACKGROUND

1. Field

The present invention relates to a battery module.

2. Description of the Related Art

A rechargeable battery or secondary battery differs from a primary battery in that the secondary battery is configured to be charged and discharged repeatedly, whereas the primary battery is configured to provide only irreversible conversion from a chemical material to electrical energy. A low-capacity rechargeable battery may be used as a power source for small electronic devices such as a cellular phone, a notebook, a computer, and a camcorder, and a large-capacity rechargeable battery may be used as a power source for a hybrid vehicle or the like.

The secondary battery may include an electrode assembly including a cathode, an anode, and a separator interposed between the cathode and the anode, a case accommodating the electrode assembly, and an electrode terminal electrically connected to the electrode assembly.

An electrolytic solution is injected into the case to enable charging and discharging of the battery by an electrochemical reaction of the cathode, the anode, and the electrolytic solution. For example, a shape of the case may be a cylindrical shape or a rectangular shape, which may be different depending on the use of the battery.

The rechargeable battery may be used in the form of a cell stack including a plurality of unit cells which are coupled in series with or in parallel to each other, thereby providing high energy density for driving of a hybrid vehicle, for example.

Meanwhile, with the development of technology, an amount of electric power required for an electric vehicle (EV), a hybrid electric vehicle (HEV) and other electrical energy consuming devices is increased, and a plurality of battery modules may be provided to satisfy the required amount of electric power.

Therefore, the development of a new module structure that may simplify the components, effectively reduce the manufacturing cost and weight, and enable the manufacturing process to proceed efficiently, while providing a plurality of cell stacks capable of meeting the required power of the electrical energy consuming device is desired.

The above information disclosed in this Background section is only for enhancement of understanding of the background of the invention and therefore it may contain information that does not form the prior art.

SUMMARY

Embodiments of the present invention provide a battery module (e.g., a large module of a battery), which effectively improves an amount of electric power, and efficiently improves a manufacturing process thereof, while simplifying component parts.

An exemplary embodiment of the present invention provides a battery module including: a cell stack including a plurality of unit cells arranged in a first direction; and an insulating member around the plurality of unit cells; a plurality of module housings, each of the module housings including a plurality of receiving parts and receiving the cell stack; and a coupling part, wherein each of the receiving parts includes a fixing wall around the cell stack, at least a portion of the fixing wall contacting the cell stack, and the fixing wall includes end walls at respective sides of each of the receiving parts in the first direction to engage end surfaces of respective sides of the cell stack in the first direction, and the coupling part of a first module housing from among the plurality of module housings is configured to be coupled to the coupling part of a second module housing from among the plurality of module housings that is adjacent to the first module housing.

The coupling part may be at a first wall and a second wall around an inner space of the respective module housing, the first wall and the second wall arranged along a second direction perpendicular to a first direction, and the coupling part at the second wall of the first module housing may be configured to be coupled to the coupling part at the first wall of the second module housing in the second direction.

The coupling part may include fastening parts at the first wall and the second wall, respectively, and the fastening part of the first wall of the second module housing may be fastened to the fastening part on the second wall of the first module housing through a fastening member.

The coupling part of the second module housing may include guide pins on the first wall and protruding in the second direction; and the coupling part of the first module housing may include guide grooves on the second wall and configured to receive the guide pins of the second module housing.

The coupling part of the second module housing may further include a connection tube defining a connection tunnel at the first wall, and protruding in the second direction, the connection tube having a hollow in which a bus bar is led from the inside of the module housing; and the coupling part of the first module housing may include a tube receiving opening on the second wall and configured to receive the connection tube of the second module housing and the bus bar.

The fastening parts may be at opposite end portions of the first wall and the second wall in the first direction, and the connection tube and the tube receiving opening may be at central portions of the first wall or the second wall, a guide pin may be between the fastening part and the connection tube, and the guide groove may be between the fastening part and the tube receiving opening.

The module housing may further include a separation wall extending in the first direction and partitioning an inner space around an outer wall of the module housing to form adjacent ones of the plurality of receiving parts, and the separation wall may correspond to a part of the fixing wall of each of the receiving parts along a second direction perpendicular to a first direction, and the separation wall may contact a side surface of the cell stack received in the respective receiving part.

The end walls may include a first end wall and a second end wall, and the first end wall may face the outer wall of the module housing and may be spaced apart from the outer wall along the first direction, defining a first space between the first end wall and the outer wall.

A first receiving part and a second receiving part from among the plurality of the receiving parts may be arranged along the first direction at the inner space of the module housing, and the second end walls of the first receiving part and the second receiving part may be spaced apart from each other and face each other, defining a second space between the second end walls of the first and second receiving parts.

The cell stack may further include a pair of end supports at opposite end portions thereof in the first direction and having outer side surfaces corresponding to the end surfaces.

The end walls may be curved outwardly such that central portions thereof are located further from the end surfaces than other portions of the end walls, and the end surfaces may be recessed inwardly such that the central portions thereof are away from the end walls facing each other, defining a third space.

The end wall may include a plurality of first ribs, the plurality of first ribs may protrude to an outer side surface in the first direction, may be spaced apart from each other in the second direction, and may extend in a third direction.

The end support may include a plurality of second ribs, the plurality of second ribs may protrude to the end wall at the end surface, and may be spaced apart from each other in the second direction and the third direction in a lattice shape.

The module housing may include a cooling channel under a bottom surface of the module housing, the cooling channel configured to accommodate a flow of coolant.

A side wall of the cooling channel may be formed integrally with the bottom surface of the module housing.

Exemplary embodiments of the present invention can efficiently improve a power amount and can efficiently improve a manufacturing process while simplifying component parts of a battery module.

DETAILED DESCRIPTION

Figure 1:
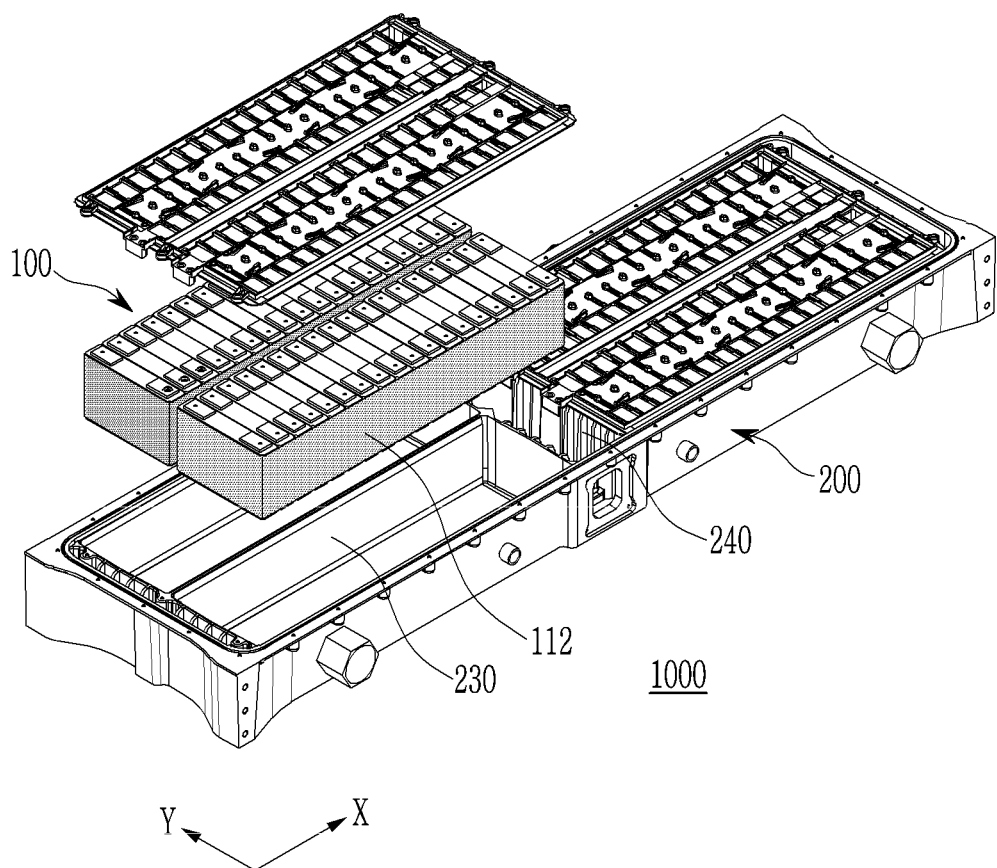
FIG. 1 is a partially exploded perspective view illustrating a battery module according to an exemplary embodiment of the present invention.

In the following detailed description, only certain exemplary embodiments of the present invention are shown and described, simply by way of illustration. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

As those skilled in the art would realize, the described embodiments may be modified in various different ways, all without departing from the spirit or scope of the present invention. Accordingly, the drawings and description are to be regarded as illustrative in nature and not restrictive. In the drawings, the relative sizes of elements, layers, and regions may be exaggerated for clarity. Unless otherwise noted, like reference numerals designate like elements throughout the attached drawings and the written description, and thus, descriptions thereof may not be repeated.

It will be understood that, although the terms "first," "second," "third," etc., may be used herein to describe various elements, components, regions, layers, and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, in the present specification, it is to be understood that when one component is referred to as being "on," "connected to," or "coupled to" another component, it may be directly on, connected to, or coupled to another component, or one or more intervening components may also be present. On the other hand, in the present specification, it is to be understood that when one component is referred to as being "directly on," "directly connected to," or "directly coupled to" another component, it should be understood that there are no intervening components present. In addition, it will also be understood that when an element or layer is referred to as being "between" two elements or layers, it can be the only element or layer between the two elements or layers, or one or more intervening elements or layers may also be present.

In addition, terms used in the present specification are used only in order to describe specific exemplary embodiments rather than limiting the present invention.

Further, in the present specification, singular forms are intended to include plural forms unless the context clearly indicates otherwise.

It should be further understood that the terms "comprises," "comprising," "includes," "including," "has," and "having" in the present specification specify the presence of features, numerals, steps, operations, components, parts mentioned in the present specification, or combinations thereof, but do not preclude the presence or addition of one or more other features, numerals, steps, operations, components, parts, or combinations thereof.

Further, in the present specification, the term "and/or" includes a combination of a plurality of stated items or any one of the plurality of stated items. In the present specification, "A or B" may include "A", "B", or "both of A and B". Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
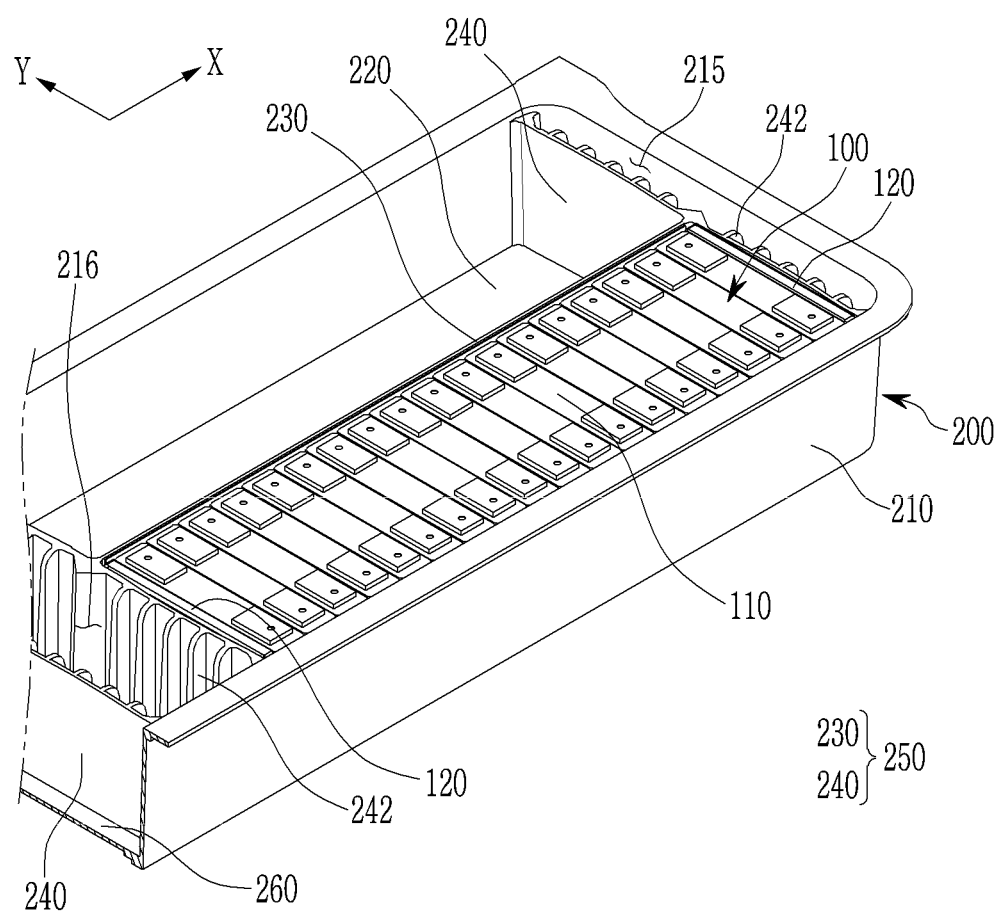
FIG. 2 is a perspective view illustrating a portion of a receiving part in the battery module according to an exemplary embodiment of the present invention.

FIG. 1 illustrates a battery module (e.g., a large module of a battery) 1000 according to an exemplary embodiment of the present invention and FIG. 2 illustrates a receiving part (e.g., a receiving unit) 220 in the battery module 1000 illustrated in FIG. 1.

As illustrated in FIGS. 1 and 2, the battery module 1000 according to an exemplary embodiment of the present invention includes a cell stack 100 and a module housing 200. The cell stack 100 may include a plurality of unit cells 110 aligned (or arranged) in (or along) a first direction X and an insulating member 112 around (or surrounding) the plurality of unit cells 110. The module housing 200 may include a plurality of receiving parts 220 into which the cell stacks 100 are inserted and aligned (or arranged) in the first direction X and a second direction Y perpendicular to the first direction X. The receiving part 220 may include a fixing wall 250 around (or surrounding) the cell stack 100 and having at least a portion which is in contact with the cell stack 100.

The cell stack 100 includes the plurality of unit cells 110 arranged (e.g., aligned or stacked) in the first direction X. Each of the unit cells 100 may include an electrode assembly, and correspond to one secondary battery including a terminal part, and may include a case having any suitable shape, such as a rectangular shape, a cylindrical shape, or the like.

FIGS. 1 and 2 illustrates the unit cells 110 each having a case having a rectangular pillar-shaped case, but the unit cells 110 are not necessarily limited thereto, and the unit cells 110 may have any suitable shape. Hereinafter, for convenience of description, the unit cells 110 are described as each having a rectangular shaped-case, as illustrated in FIGS. 1 and 2.

The plurality of unit cells 110 are arranged (e.g., aligned) in the cell stack 100 in (e.g., along) any suitable alignment direction, but in some embodiments, the plurality of unit cells 110 may be arranged (e.g., aligned) in (e.g., along) a direction in which relatively wider side surfaces among the side surfaces of the unit cells 110 face each other, as illustrated in FIGS. 1 and 2. The alignment direction of the unit cells 110 is hereinafter defined as the first direction X. The unit cells 110 or end supports 120 may be disposed at both ends of the cell stack 100 in the first direction X.

The number of unit cells 110 configuring the cell stack 100 may be varied as necessary or desired. The unit cells 110 included in one cell stack 100 may be electrically connected to each other through bus bars 436 (see FIG. 6) having any suitable shape.

The cell stack 100 may include an insulating member 112 around (or surrounding) the plurality of unit cells 110. The insulating member 112 may be formed of an insulating material such as rubber, plastic, or the like, and may be located around (or surround) the plurality of unit cells 110.

The insulating member 112 may also be provided around (or to surround) the end supports 120 disposed at both ends of the cell stack 100 in the first direction X together with the plurality of unit cells 110, or may be around (or surround) only the plurality of unit cells 110 (and not the end supports 120), and the end supports 120 may also be separately disposed at both ends of the cell stack 100.

The insulating member 112 may be provided in a film form or may also have a plurality of plate-shaped configurations having rigidity, for example. The insulating member 112 may be provided in the form surrounding all four side surfaces of the cell stack 100, or may be disposed only on a portion of the four side surfaces, and may also be provided around (or to surround) both the upper surface and the lower surface of the cell stack 100. However, the insulating member 112 disposed on the upper surface of the cell stack 100 may be provided to expose the terminal part of each of the unit cells 110.

FIG. 1 illustrates an embodiment in which the insulating member 112 is provided in the form of an insulating film and is provided around (or to surround) the side surfaces of the plurality of unit cells 110 and is not around (or does not surround) the end supports 120 in the cell stack 100.

The module housing 200 includes a plurality of receiving parts 220 into which the cell stacks 100 are each inserted (or received). FIG. 1 illustrates an embodiment in which four receiving parts 220 are formed in the module housing 200, and FIG. 2 separately illustrates two receiving parts 220 in the module housing 200 illustrated in FIG. 1. According to embodiments of the present invention, any suitable number of receiving parts 220 may be formed in the module housing 200.

The module housing 200 has an outer wall 210 extending upwardly from a bottom surface (or a floor surface) 260 and around (or surrounding) the bottom surface 260, and an inner space is defined inside (or by) the outer wall 210. The plurality of receiving parts 220 may be formed (or provided) in the inner space.

The module housing 200 may have any suitable shape, for example, the module housing 200 according to an exemplary embodiment of the present invention may be provided to have a bottom surface 260 having a substantially rectangular shape, as illustrated in FIGS. 1 and 2.

An upper portion of the module housing 200 may be open, and accordingly, the receiving part 220 formed in the module housing 200 may also have an upper portion of the receiving part 220 that is open. A module cover may be coupled to and seal the open upper surface of the module housing 200, and when the module cover is coupled to the module housing 200, the module cover corresponds to an upper surface of the receiving part 220. The module cover may include a bus bar holder for covering the cell stack 100, and bus bars arranged in the bus bar holder to electrically connect the unit cells 110 constituting the cell stack 100.

FIGS. 1 and 2 illustrate the receiving part 220 according to an exemplary embodiment of the present invention. The receiving part 220 includes the fixing wall 250 surrounding the cell stack 100 and having at least a portion which is in contact with the cell stack 100.

FIG. 1 illustrates an embodiment where the receiving part 220 (e.g., a first receiving part 220), into which the cell stack 100 is inserted, and the receiving part 220 (e.g., a second receiving part 220), into which the cell stack 100 is not inserted, are disposed in parallel with each other. The fixing wall 250 corresponds to a boundary wall around (or surrounding) a region of the receiving part 220, and the cell stack 100 inserted into the receiving part 220 stably maintains a fixed state with the fixing wall 250 around (or surrounding) the cell stack 100 on four sides.

The fixing wall 250 may be variously disposed according to the form of the cell stack 100, but may be disposed around (or to surround) the cell stack 100 while having four surfaces facing and supporting side surfaces in four directions of the cell stack 100, as illustrated in FIG. 1.

At least a portion of the fixing wall 250 of the receiving part 220 may be in direct contact with the cell stack 100. For example, any one of the surfaces of the fixing wall 250 positioned in the first direction X may also be in direct contact with the cell stack 100, and any one of the surfaces of the fixing wall 250 positioned in the second direction Y perpendicular to the first direction X may also be in direct contact with the side surfaces of the plurality of unit cells 110, for example, the insulating member 112.

The second direction Y may be defined as a direction perpendicular to the first direction X on the same plane as that of the first direction X, and may be defined as a width direction of the unit cell 110, as illustrated in FIG. 1.

As described above, according to an exemplary embodiment of the present invention, the cell stack 100 may maintain a shape thereof by the fixing wall 250 even without a separate component, and may maintain an engaged state (e.g., a pressurized state or a pressed state) in the first direction X.

In a general battery module (i.e., not the battery module 1000 according to embodiments of the present invention), a module frame is coupled to one cell stack, and one cell stack to which the module frame is coupled and which is handled as a unit configuration configures one modules.

The generally cell stack may be coupled to the module frame for a performance aspect, such as energy density and ease of handling, and the module frame may include end blocks pressurizing (or pressing) both ends of the cell stack and side plates extending along side surfaces of the cell stack, and the end blocks and the side plates are coupled to each other such that the cell stack is pressed (or pressurized), thereby making it possible to maintain the structure of the cell stack.

In the general battery module, the cell stack coupled with the module frame is inserted and the module housing is fastened to the module frame, and the general battery module has the power amount provided by one cell stack.

In the case of the general battery module, a plurality of battery modules needs to be provided so as to meet higher power demanded than that of one cell stack, and thus, a module frame fastening the cell units into a unit body and a plurality of components configuring a module itself are additionally required.

Therefore, when the battery module is used in an electrical energy consumption device such as an electric vehicle (EV) requiring high power, a process for manufacturing the battery module may be increased, the consumption for the components may be increased, a weight of the battery module may be increased, and the time and cost required for manufacturing the battery module may be increased.

However, the battery module 1000 according to an exemplary embodiment of the present invention provides a high demand power because the plurality of cell stacks 100 are mounted in one module, and because the cell stack 100 is fixed by the fixing wall 250 of the receiving part 220, of which at least a part is distinguishable (or differentiated) from the outer wall 210 of the module housing 200, a component for fixing the cell stack 100 (e.g., the module frame) is not separately required (or needed).

For example, as shown in FIG. 1 and FIG. 2, in an exemplary embodiment of the present invention, the plurality of receiving parts 220 are included in module housing 200, the fixing wall 250 around (or surrounding) the receiving part 220 is provided to fix each cell stack 100 while being around (or surrounding) the same, unlike the outer wall 210 of the module housing 200.

As shown in FIG. 1 and FIG. 2, in an exemplary embodiment of the present invention, the module housing 200 may include end walls 240 that extend in the second direction Y and may be disposed at both ends of each of the plurality of receiving parts 220 in the first direction X to engage (e.g., to press) the end surfaces at both sides of the cell stack 100 in the first direction X, and may correspond to a part of the fixing wall 250.

In the exemplary embodiment of the present invention, the side surfaces of both ends of the cell stack 100 in the first direction X are defined as the end surfaces, respectively. According to an exemplary embodiment of the present invention, the end surface may correspond to the insulating member 112 or one surface of the end support 120.

FIGS. 1 and 2 illustrate a configuration in which the end walls 240 are disposed at both sides of the cell stack 100 in the first direction X, respectively. A plurality of end walls 240 may exist in the module housing 200 and may correspond to both sides of the fixing wall 250 of the receiving part 220 in the first direction X.

The end wall 240 may be distinguished from the outer wall 210 of the module housing 200. For example, the end wall 240 has a shape protruding from the bottom surface 260 in the inner space of the module housing 200 and extends in the second direction Y. The end walls 240 may include a first end wall 240 and a second end wall 240. The first end walls 240 may be disposed so as to be spaced apart from the outer wall 210 facing one surface, and the second end walls 240 may face each other, as discussed further below.

FIG. 1 illustrates an embodiment including a plurality of receiving parts 220, for example a total of four receiving parts 220, with two in the first direction X and two in the second direction Y, and one separation wall 230 that crosses a portion of the inner space of the module housing 200 in the first direction X and four end walls 240 extending in the second direction Y.

The separation wall 230 is shared by the receiving parts 220 adjacent to each other (or stacked) in the second direction Y, but the end walls 240 are not shared by adjacent receiving parts 220 stacked in the first direction X. Instead, respective end walls 240 (e.g., the second end walls 240) are disposed to be spaced apart from each other and to face each other at ends of the two receiving parts 220 that face each other in the first direction X.

For example, the end wall 240 may be disposed so that one surface (e.g., a first surface) thereof makes contact with an end surface of the cell stack 100 inserted into a corresponding receiving part 220 and an opposite surface (e.g., a second surface) thereof is spaced apart from the outer wall 210 and faces the other wall 210 or the end wall 240 of another receiving part 220 that is disposed in parallel in the first direction X.

A pair of end walls 240 disposed at both sides of the receiving part 220 in the first direction X is in direct contact with the end surface of the cell stack 100 facing each other, for example, at least a portion of one surface of the end support 120. In addition, the end wall 240 may be disposed to engage (e.g., to press) the cell stack 100 in the first direction X.

As described above, in an exemplary embodiment of the present invention, the cell stack 100 inserted into the receiving part 220 is not fastened to the module frame, such as the end block or the side plate, but the insulation member 112 may be around the lateral surfaces of the cell stack 100 where the plurality of unit cells 110 is arranged (or aligned only aligned), and in the battery module 1000 according to an exemplary embodiment of the present invention, the end walls 240 may serve to engage (e.g., to press) and fix the cell stack 100 in the first direction X.

The cell stack 100 is engaged (e.g., pressed) in the first direction X to provide higher power under the same volume, and may be maintained in a structurally stable state.

The cell stack 100 may be inserted between the fixing walls 250 of the receiving part 220, e.g., between the pair of end walls 240 provided at both sides in the first direction X, in an engaged (or pressed) state by a jig inserted into the receiving part 220 in a state in which the end surface is engaged (or pressed).

Figure 3:
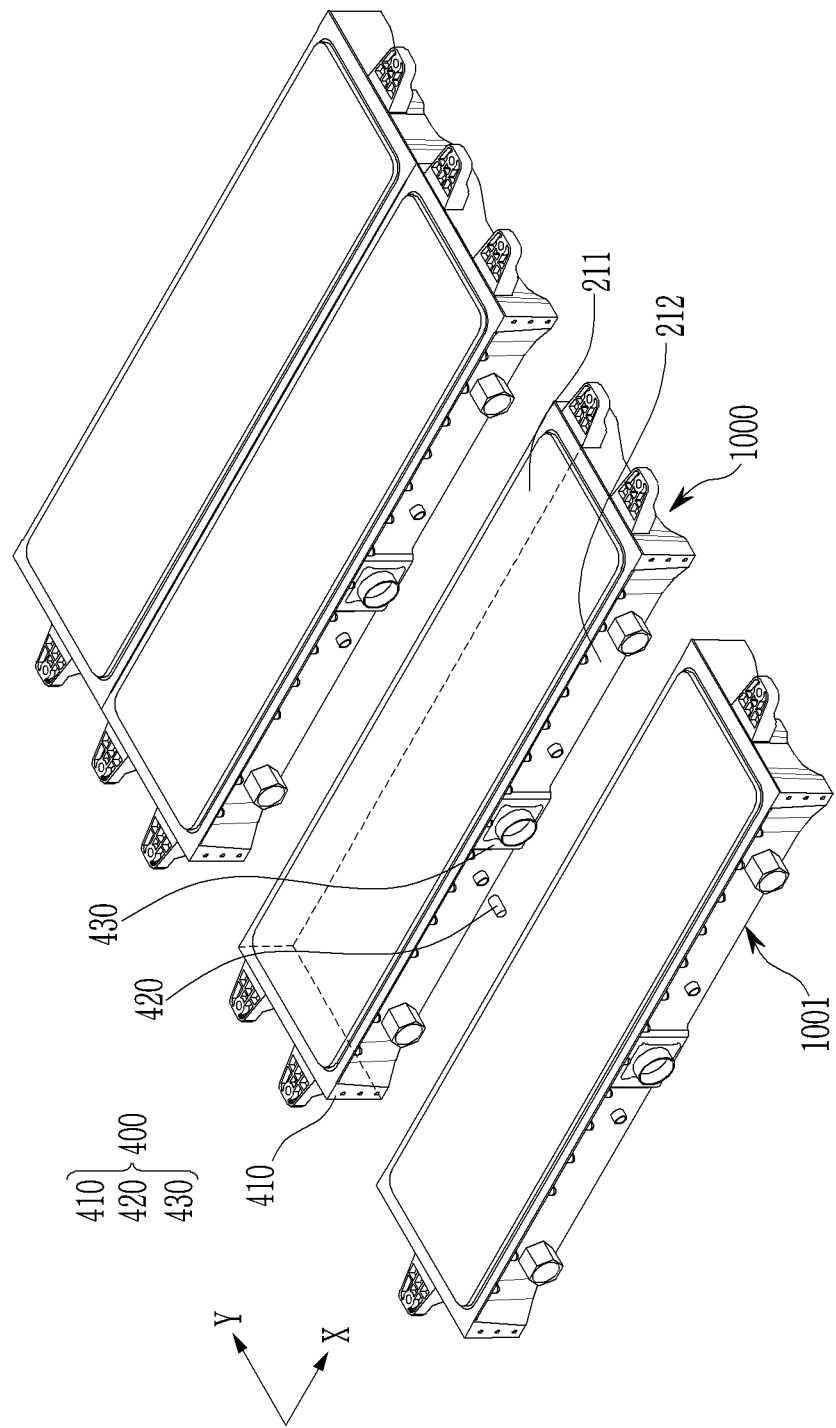
FIG. 3 is a perspective view of a plurality of battery modules according to an exemplary embodiment of the present invention that are coupled to each other.

FIG. 3 illustrates a plurality of battery modules 1000 according to the exemplary embodiment of the present invention that are coupled with adjacent battery modules. For example, FIG. 3 illustrates a plurality of battery modules 1000 that are coupled with each other to form a large pack.

As illustrated in FIG. 3, each of the battery modules 1000 according to the exemplary embodiment of the present invention may further include a coupling part 400, which is provided at the module housing 200 and is coupled with an adjacent battery module 1001 (e.g., an adjacent module housing).

According to embodiments of the present invention, a plurality of receiving parts 220 are provided in a module housing 200 so that high output is efficiently implemented by including the plurality of cell stacks 100. In some embodiments, power required from an electrical energy consumption device may offset an output provided from the battery module 1000 according to an exemplary embodiment of the present invention.

Figure 5:
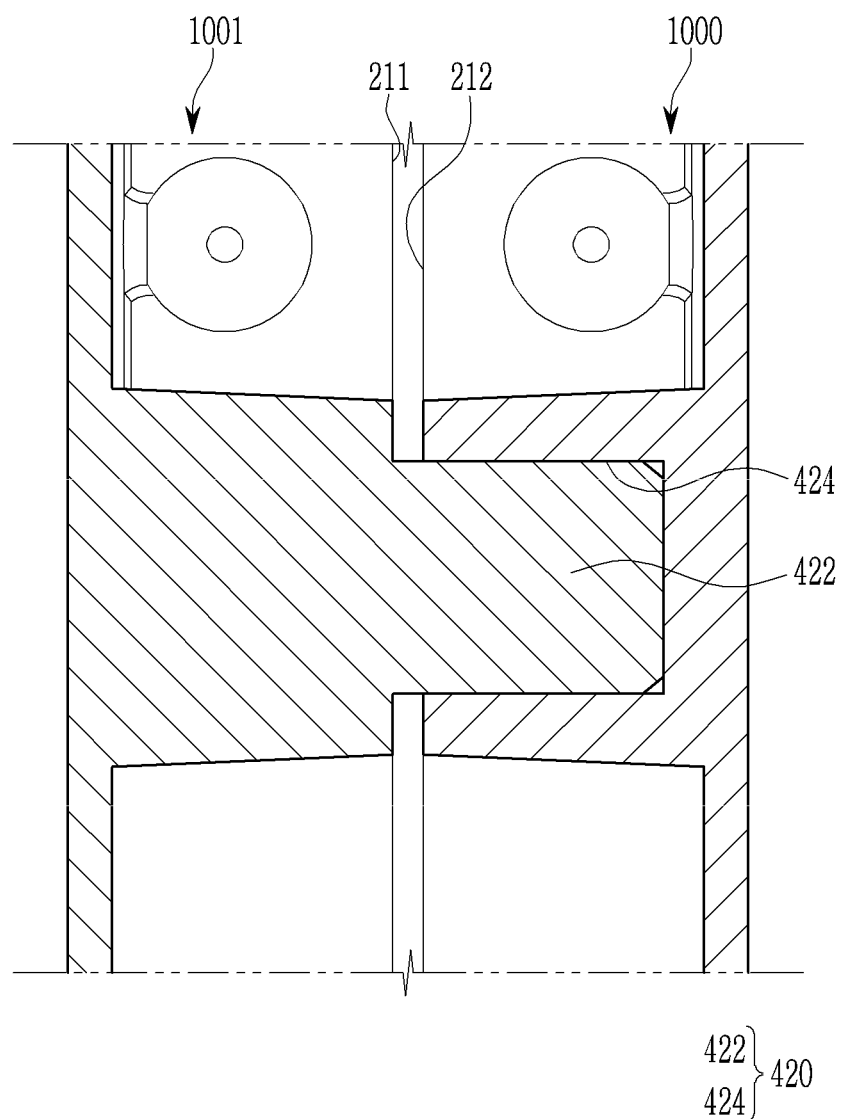
FIG. 5 is a side elevational view illustrating a cross section of a guide part in the adjacent battery modules according to an exemplary embodiment of the present invention.

The battery modules 1000 may be coupled with each other in order to meet power demanded to implement a large pack structure. FIG. 5 illustrates an embodiment where the coupling part 400 (e.g., a guide part 420) is formed on one surface of the module housing 200, and the coupling parts 400 (e.g., the guide parts 420) of the battery module 1000 and the adjacent battery module 1001 are coupled to each other.

The coupling part 400 may be provided in any suitable type or shape. For example, FIG. 3 illustrates fastening parts 410 that are fastened to each other through a fastening member 415, the guide parts 420 which align positions of the respective fastening parts 410 of the corresponding battery module 1000 and the adjacent battery module 1001, and connection parts 430, which are connection passages of the bus bar 436 (see FIG. 6) for electrical connection with the adjacent battery module 1001 according to an exemplary embodiment of the present invention.

As illustrated in FIG. 3, in the battery module 1000 according to an exemplary embodiment of the present invention, the outer walls 210 may include a first wall 211 and a second wall 212 positioned in the second direction Y (or spaced apart along the second direction Y) among the outer walls 210 of the module housing 200. The coupling parts 400 may be provided on the first wall 211 and the second wall 212, and the coupling part 400 provided on the second wall 212 of the module housing 200 of the battery module 1000 may be configured to be coupled to the coupling part 400 provided on the first wall 211 of the adjacent battery module 1001.

The coupling parts 400 may be included in the module housing 200, as shown in FIG. 3, and may be disposed at an outer wall 210 of the module housing 200. The coupling parts 400 may be formed at two facing surfaces among the four surfaces of the outer wall 210 so that a plurality of battery modules 1000 may be coupled to each other.

Specifically, in the battery module 1000 according to an exemplary embodiment of the present invention, because the plurality of cell stacks 100 are inserted thereinto and the cell stacks 100 include the plurality of unit cells 110 aligned in the first direction X, the module housing 200 may have a cross section of a rectangular shape having a longer length in the first direction X.

Accordingly, in an exemplary embodiment of the present invention, the coupling parts 400 may be disposed at the first wall 211 and the second wall 212 located in a second direction Y among the outer walls 210 of the module housing 200 so that an entire length of the plurality of module housings 200 may be reduced, even if a plurality of module housings 200 are aligned in a line and coupled through the coupling parts 400. However, a cross sectional shape of the module housing 200 or a location of an outer wall 210 in which the coupling part 400 is disposed are not necessarily limited thereto.

The coupling part 400 disposed on the first wall 211 of any one of the module housings 200 may be coupled to (or may be configured to be coupled to) the coupling part 400 disposed on the second wall 212 of an adjacent module housing facing the first wall 211, and the coupling part 400 disposed on the second wall 212 of any one of the module housings 200 may be coupled to (or may be configured to be coupled to) the coupling part 400 disposed on the first wall 211 of the adjacent module housing facing the second wall 212.

The coupling part 400 disposed at the first wall 211 in the module housing 200 of the battery module 1000 may be inserted into and coupled to the coupling part 400 of the adjacent battery module 1001. For example, the fastening part 410, a guide pin 422 of the guide part 420, and a connection tube 432 that defines a connection tunnel of the connection part 430 may be disposed on the first wall 211.

Further, the coupling part 400 disposed at the second wall 212 may be coupled to the coupling part 400 of the adjacent battery module 1001 by inserting the coupling part 400 of the adjacent battery module 1001 into (or inside) the coupling part 400 at the second wall 212. For example, the fastening part 410, a guide groove 424 of the guide part 420, and a tube receiving opening (or tunnel insertion hole or tunnel receiving opening) 434 of the connection part 430 may be disposed in the second wall 212. However, an insertion relationship and each configuration of the coupling parts 400 disposed at the first wall 211 and the second wall 212 are not necessarily limited thereto.

Figure 4:
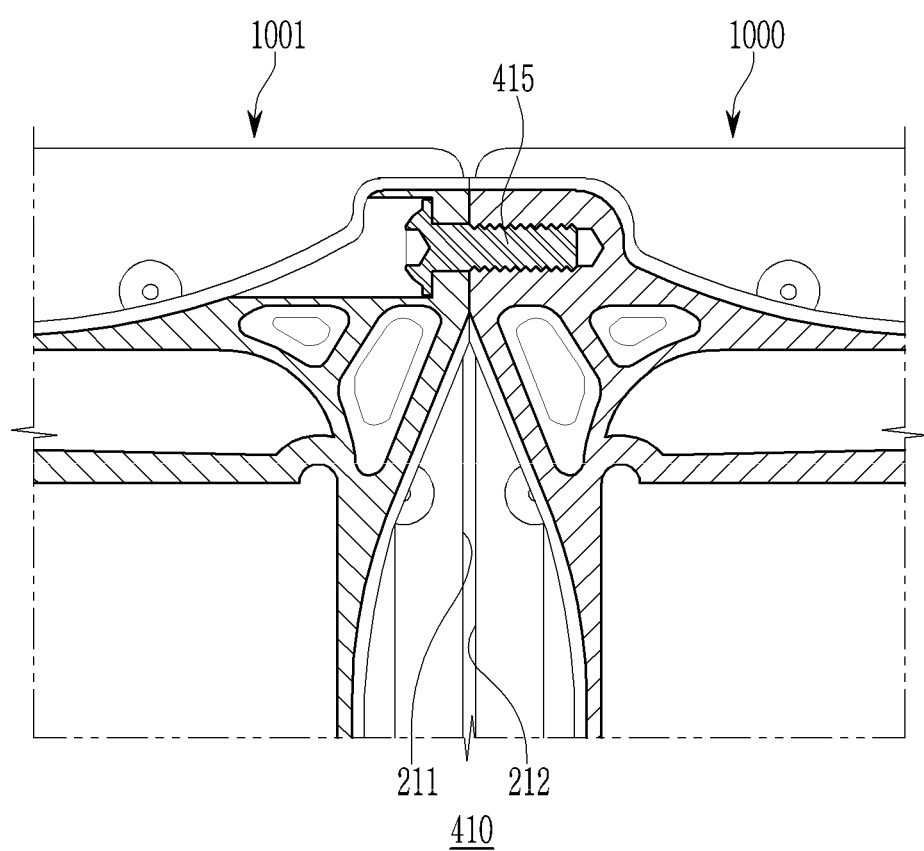
FIG. 4 is a side elevational view illustrating a cross section of a fastening part of adjacent battery modules according to an exemplary embodiment of the present invention.

FIG. 3 illustrates the fastening part 410 of the coupling part 400 that is configured to be fastened to the adjacent battery module 1001 adjacent to the module housing 200 of the corresponding battery module 1000 according to an embodiment of the present invention, and FIG. 4 illustrates the fastening parts 410 fastened to each other between the module housing 200 of the corresponding battery module 1000 and the module housing 200 of the adjacent battery module 1001.

As shown in FIG. 3 and FIG. 4, in an exemplary embodiment of the present invention, the coupling part 400 includes the fastening parts 410 formed in the first wall 211 and the second wall 212, respectively. The fastening part 410 of the first wall 211 may be fastened to the fastening part 410 formed at the second wall 212 of the adjacent battery module 1001 through a fastening member 415.

The fastening part 410 corresponds to a portion in which the corresponding module housing 200 of the battery module 1000 and the module housing 200 of the adjacent battery module 1001 are fastened to each other and are fixed among the plurality of components of the coupling part 400.

The fastening parts 410 may be provided on the first wall 211 and the second wall 212 of the module housing 200, respectively, and may be provided on both end portions of the first wall 211 and the second wall 212, respectively, as illustrated in FIG. 3.

The fastening part 410 provided on the second wall 212 of any one of the module housings 200 may be fastened to the fastening part 410 provided on the first wall 211 of the adjacent battery module 1001, and the fastening member 415 for fastening the fastening parts 410 to each other may be provided.

The fastening part 410 may have any suitable type or shape, and in FIG. 4, according to an exemplary embodiment of the present invention, a fastening opening (or fastening hole) through which the fastening member 415 penetrates may be formed in the fastening part 410, and the fastening member 415 may penetrate through the respective fastening openings provided in a pair of fastening parts 410 and may be fixed to couple the corresponding module housing 200 and the adjacent battery module 1001 to each other.

The fastening member 415 may be provided in various types and shapes, and FIG. 4 illustrates the fastening member 415 provided in the form of a bolt penetrating through the fastening hole according to an exemplary embodiment of the present invention.

FIG. 5 illustrates a cross section of the guide pin 422 and the guide groove 424 after coupling to each other according to an exemplary embodiment of the present invention.

As shown in FIG. 5, in an exemplary embodiment of the present invention, the coupling part 400 is positioned on the first wall 211, and may include the guide pin 422 protruding in the second direction Y and the guide groove 424 positioned on the second wall 212 and in which the guide pin 422 of the adjacent battery module 1001 is inserted.

The coupling part 400 may include the guide part 420, and the guide part 420 may be configured by the guide pin 422 and the guide groove 424. The guide pin 422 and the guide groove 424 may be disposed at opposite sides on the first wall 211 or the second wall 212 of the module housing 200. For example, the guide pin 422 may be disposed on the first wall 211 and the guide groove 424 may be disposed on the second wall 212.

According to an exemplary embodiment of the present invention, a fixed relationship between the corresponding module housing 200 of the battery module 1000 and the adjacent battery module 1001 may be formed by the fastening part 410, and the guide part 420 may be provided so that the fastening part 410, to which the fastening member 415 is coupled, may maintain a simple and stable fastening position.

Referring to FIG. 3 and FIG. 5, the guide pin 422 may be formed to externally protrude along the second direction Y from the first wall 211 of the module housing 200.

The guide pin 422 may be manufactured separately from the module housing 200 and coupled to the first wall 211, and may also be formed integrally with the module housing 200.

The guide pin 422 may have any suitable shape. FIG. 3 and FIG. 5 illustrate a guide pin 422 having a substantially circular shape, but the present invention is not limited thereto.

The guide groove 424 may be provided on (or in) the second wall 212 of the module housing 200, and may have the form of a groove recessed inwardly along the second direction Y on (or in) the second wall 212 of the module housing 200. A shape of a cross section of the guide pin 422 may be provided to correspond to a shape of a cross section of the guide groove 424.

The guide pin 422 provided on the first wall 211 of the adjacent battery module 1001 is configured to be inserted into the guide groove 424 provided in the second wall 212 of any the module housing 200 of the battery module 1000 adjacent thereto, and is coupled thereto. In a process in which the guide pin 422 is inserted into the guide groove 424, the module housing 200 of the battery module 1000 and the adjacent battery module 1001 form a stable coupling position, and accordingly, when the guide pin 422 is inserted into the guide groove 424, the respective fastening parts 410 of the corresponding module housing 200 of the battery module 1000 and the adjacent battery module 1001 may be aligned at positions at which they face each other and may be fastened to each other.

For example, according to an exemplary embodiment of the present invention, the coupling part 400 includes the guide part 420 together with the fastening part 410, thereby making it possible to easily achieve an arrangement state for coupling the two or more module housings 200 to each other.

Figure 6:
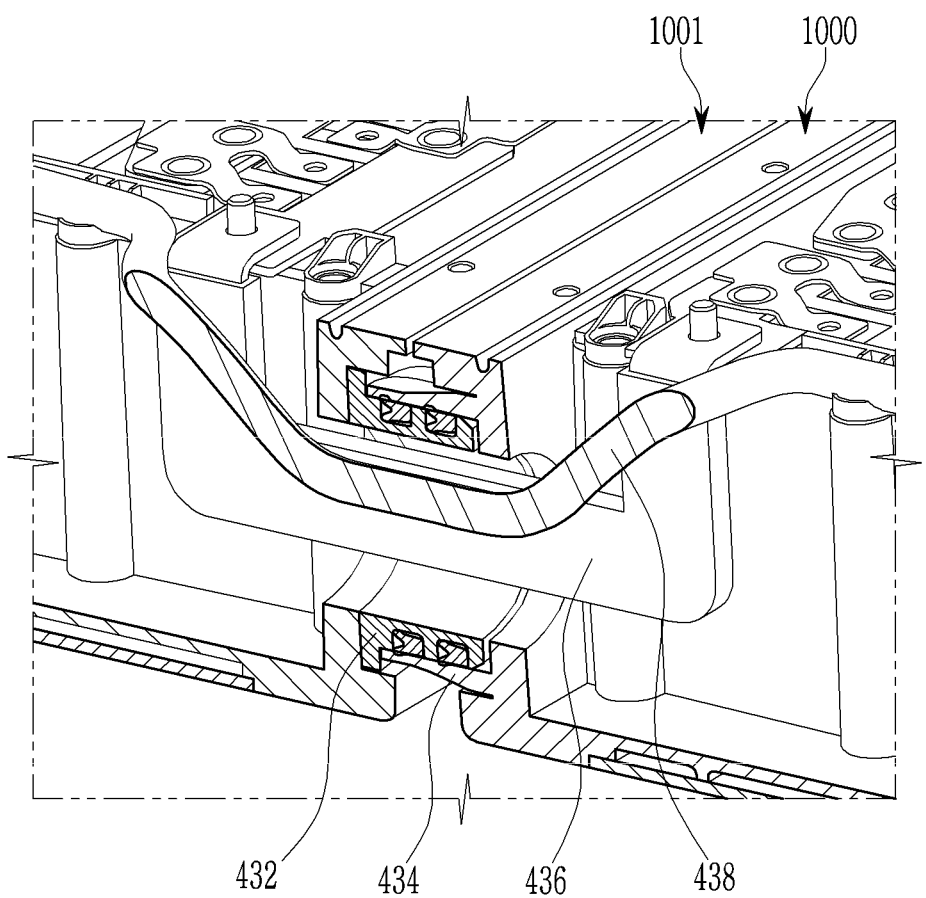
FIG. 6 is a perspective view illustrating a cross section of a connection part in the adjacent battery modules according to an exemplary embodiment of the present invention.

FIG. 6 illustrates a cross-section of the connection part 430 in the battery module 1000 according to an exemplary embodiment of the present invention. As illustrated in FIG. 6, according to an exemplary embodiment of the present invention, the coupling part 400 may further include the connection tube 432 positioned on the first wall 211, protruding in the second direction Y, and having a hollow form in which the bus bar 436 is led from the inside of the module housing 200, and the tube receiving opening 434 positioned on the second wall 212 and into which the connection tube 432 of the adjacent battery module 1001 and the bus bar 436 are inserted.

In an exemplary embodiment of the present invention, when two or more module housings 200 are coupled to each other, a connection of the module bus bars 436 may be required for the cell stacks 100 of each module housing 200 to be electrically connected to each other, and when the module housing 200 itself is provided with a control module for controlling a cooling performance or monitoring the unit cell 110, connection lines 438 for transmitting and receiving management control signals of the respective control modules should be connected to each other.

Accordingly, according to an exemplary embodiment of the present invention, the connection part 430 may be included in the coupling part 400, and connection members for electrical connection or information connection between the two module housings 200 through the connection part 430 may be connected into the two module housings 200.

The connection part 430 may be configured by the connection tube 432 and the tube receiving opening 434. The connection tube 432 may be disposed on the first wall 211 at the outer wall 210 of the module housing 200, and the tube receiving opening 434 may be disposed on the second wall 212 at the outer wall 210 of the module housing 200.

The connection tube 432 may have a form protruding in the second direction Y from the first wall 211 like the guide pin 422, and the position of the connection tube 432 on the first wall 211 may be at any suitable location, and according to an exemplary embodiment of the present invention, the connection tube 432 may be disposed at a center side (or central area) of the first wall 211.

The connection tube 432 may be provided in a cylindrical shape having a hollow penetrating through the first wall 211, and the bus bar 436 or the connection line 438 may be led outside of the module housing 200 from inside of the module housing 200 through the hollow therein.

The bus bar 436 is connected with a plurality of cell stacks 100 included at an inner space of the module housing 200 and is led to the outside from the inner space through the connection tube 432.

The module bus bar 436 led through the connection tube 432 may be inserted into the adjacent battery module 1001 through the tunnel insertion hole 434 provided in the adjacent battery module 1001, and may be electrically connected to the plurality of cell stacks 100 existing in the inner space of the adjacent battery module 1001.

The tunnel receiving opening 434 is provided on the second wall 212 like the guide groove 424, and penetrates through the second wall 212 to communicate the inside and the outside of the module housing 200 with each other. A cross-sectional shape of the tunnel receiving opening 434 may be a shape corresponding to the connection tube 432, and a position thereof may also be a position corresponding to the connection tube 432.

The connection tube 432 of the adjacent battery module 1001 is inserted in the tunnel receiving opening 434 of the module housing 200 to be coupled to each other. The bus bar 436 and the connection lines 438 led through the hollow of the connection tube 432 of the adjacent battery module 1001 are input into the module housing 200 through the tunnel receiving opening 434 of the module housing 200.

For example, the coupling part 400 includes the connection part 430, such that an electrical connection and a signal connection may be easily performed when the adjacent battery modules 200 are coupled to each other, and the connection members such as the bus bar 436 and the connection line 438 for electrical connection and signal connection may be effectively coupled to each other without being exposed to the outside when the adjacent battery module 1001 is coupled thereto.

FIG. 6 illustrates an embodiment in which the connection tube 432 is inserted into the tunnel receiving opening 434 so that the bus bar 436 and the connection line 438 are positioned inside the connection part 430. The bus bar 436 and the connection line 438 connect a corresponding module housing 200 of the battery module 1000 with the adjacent battery module 1001.

As illustrated in FIG. 3, in the battery module 1000 according to an exemplary embodiment of the present invention, the fastening parts 410 may be disposed at both end portions of the first wall 211 and the second wall 212 in the first direction X, respectively, the connection tunnels 432 and the tunnel receiving openings 434 may be disposed at the central portion of the first wall 211 or the second wall 212, guide pins may be disposed between the fastening part 410 and the connection tube 432, respectively, and the guide grooves 424 may be disposed between the fastening part 410 and the tunnel receiving opening 434, respectively.

For example, the connection tunnels 432 and the tunnel receiving openings 434 are positioned at central portions of the first wall 211 and the second wall 212, respectively. The guide parts 420 may be disposed at both sides of the first wall 211 and the second wall 212, respectively. The fastening parts 410 may be positioned at both ends of the first wall 211 and the second wall 212 as an outer side of the guide part 420.

According to an exemplary embodiment of the present invention, the fastening parts 410 may be disposed at both end portions of the first wall 211 and the second wall 212 so that structural stability may be improved by the fastening parts 410, and a plurality of guide parts 420, for example, a pair of guide parts 420 may be provided and may be disposed at both sides of the central portions of the first wall 211 and the second wall 212 so that a guide effect by the guide parts 420 is increased. The connection part 430 may be disposed at the central portions of the first wall 211 and the second wall 212 lead and connect (e.g., easily lead and connect) the module bus bar 436 and the connection line 438. However, positional characteristics of the components of the coupling part 400 may be changed or modified, as necessary or desired.

Figure 12:
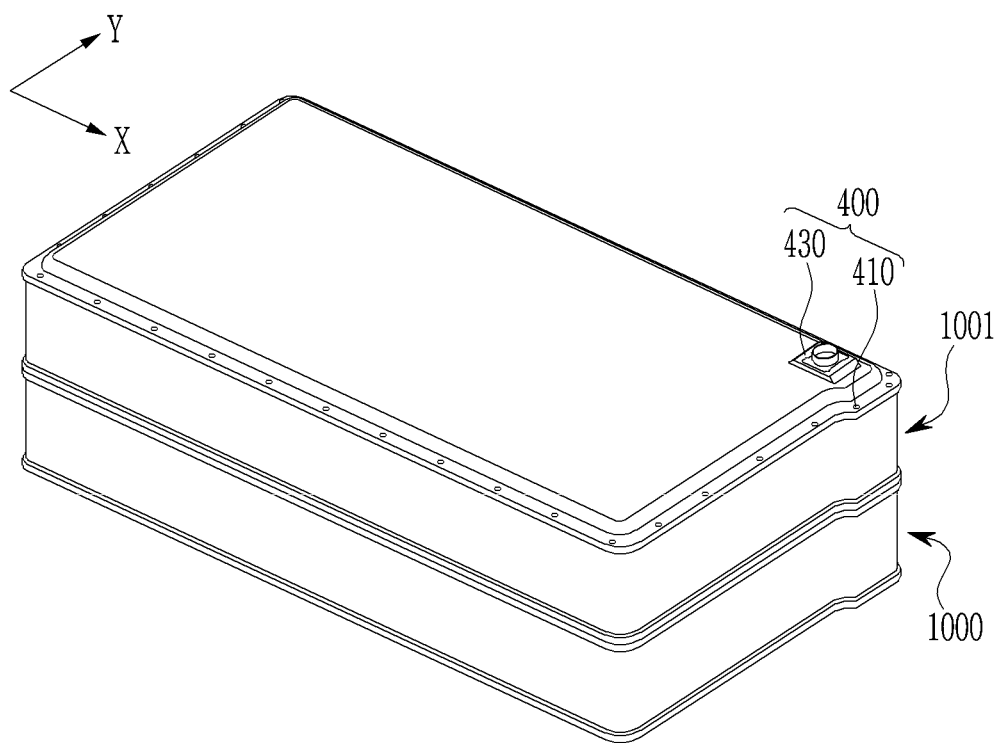
FIG. 12 is a perspective view of a plurality of battery modules according to an exemplary embodiment of the present invention that are coupled to each other.

FIG. 12 illustrates a figure in which a plurality of battery modules according to another exemplary embodiment of the present disclosure are provided and are interconnected. That is, FIG. 12 illustrates a figure in which the battery modules are coupled to each other to form a large pack (e.g., a battery pack).

As shown in FIG. 12, the coupling parts 400 are formed on the upper surface (or module cover) and the bottom surface of the battery module, and the coupling parts 400 between the battery modules adjacent to each other are coupled to each other. Accordingly, the plurality of battery modules may be stacked in the vertical direction (directions perpendicular to the first direction X and the second direction Y) through the coupling parts 400.

For example, the connection part 430 (e.g., the connection tube) disposed on the upper surface of the battery module 1000 may be inserted into the connection part 430 (e.g., the tunnel receiving opening) disposed on the bottom surface of the adjacent battery module 1001. In addition, the connection parts 430 may be connection passages of the module bus bar and the connection line.

Referring again to FIGS. 1 and 2, in the battery module 1000 according to an exemplary embodiment of the present invention, the module housing 200 may further include the separation wall 230 extending in the first direction X and partitioning the inner space surrounded by the outer wall 210 to contribute to form the plurality of receiving parts 220. The separation wall 230 may configure (or form) a portion of the fixing walls 250 of the two receiving parts 220 disposed at both sides along the second direction Y, and may be in contact with the side surfaces of the cell stack 100 inserted into each of the two receiving parts 220.

The side surfaces refer to both side surfaces extending in the first direction X among the side surfaces of the cell stack, for example, both side surfaces of the cell stack 100 in the second direction Y, and as described above, because the cell stack 100 according to the present invention does not include the separate module frame, the side surfaces may correspond to the insulating member 112 surrounding the side surfaces of the plurality of unit cells 110.

The separation wall 230 may protrude upwardly from the bottom surface 260 of the module housing 200, and may be provided to divide the inner space of the module housing 200 while extending along the first direction X. For example, the separation wall 230 may correspond to a portion of the fixing wall 250 surrounding (or around) the receiving part 220, e.g., one surface thereof.

Referring to FIGS. 1 and 2, the receiving parts 220 may be formed at both sides of the separation wall 230, and the separation wall 230 becomes (or forms) the fixing wall 250 for the two receiving parts 220 formed at both sides thereof.

Referring to FIG. 2, the separation wall 230 faces the side surfaces of the cell stack 100 inserted into the receiving part 220, and accordingly, the separation wall 230 corresponding to a portion of the fixing wall 250 is in direct contact with at least a portion of the side surfaces of the cell stack 100 inserted into the receiving part 220 to thereby support the cell stack 100 in the second direction Y.

Figure 7:
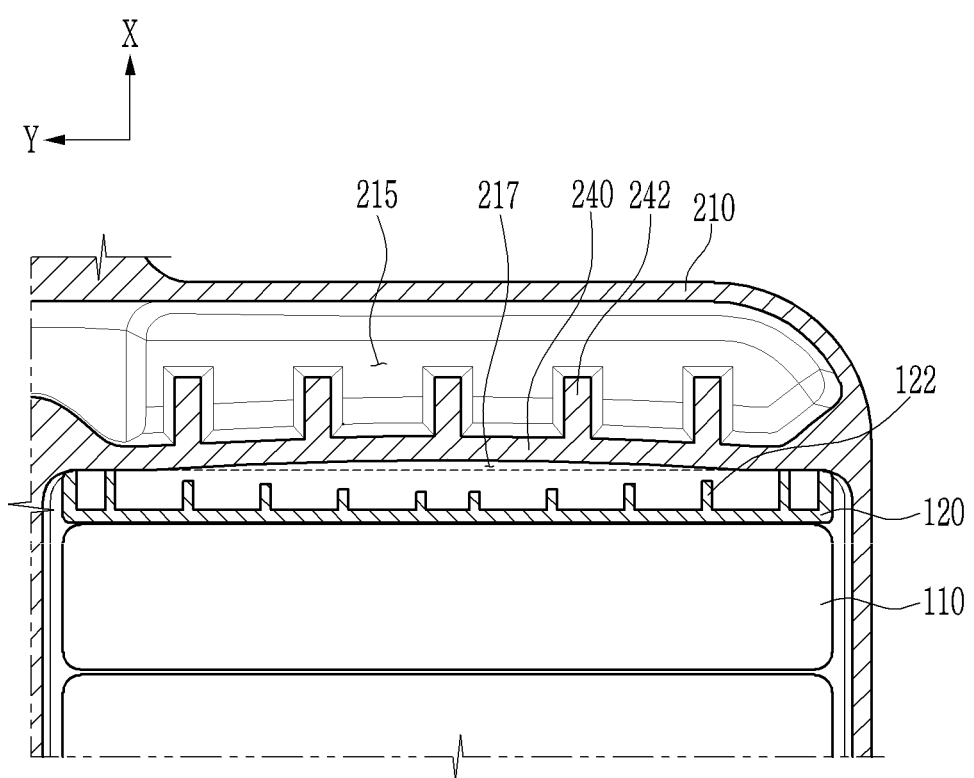
FIG. 7 is a cross-sectional view illustrating a portion of an end wall and an end support in the battery module according to an exemplary embodiment of the present invention.

FIG. 7 illustrates a cross section of the end wall 240 spaced apart from the outer wall 210 of the module housing 200. As illustrated in FIG. 7, in an exemplary embodiment of the present invention, the end wall 240 may be disposed so that a surface thereof (e.g., a surface of a second side thereof) faces the outer wall 210 of the module housing 200, may be spaced apart from the outer wall 210 along the first direction X to form a first space (e.g., a first impact absorbing space) 215 between the outer wall 210 and the end wall 240.

In an exemplary embodiment of the present invention, a plurality of end walls 240 may be provided, as illustrated in FIGS. 1 and 2, and the end wall 240 facing the outer wall 210 from among the plurality of end walls 240 may be spaced apart from the outer wall 210 of the module housing 200 facing the end wall 240 in the first direction X, as illustrated in FIG. 7 to form the first space 215 between the outer wall 210 of the module housing 200 and the end wall 240.

FIG. 2 and FIG. 7 illustrate the end wall 240 facing the outer wall 210 of the module housing 200 from among the end walls 240 constituting the fixing wall 250 of the receiving part 220, and illustrate an embodiment in which the first space 215 is formed between the end wall 240 and the outer wall 210. FIG. 7 illustrates the first space 215 shown in FIG. 2 viewed from a top view.

The module housing 200 protects (or safely protects) the cell stack 100 inserted into the receiving part 220 against an impact transferred from outside of the module housing 200, and in the exemplary embodiment of the present invention, the first end wall 240, which is in direct contact with the end surface of the cell stack 100 and supports and engages (e.g., presses) the cell stack 100, is spaced apart from the outer wall 210, thereby preventing the impact transferred to the outer wall 210 from being directly transferred to the first end wall 240, or reducing the likelihood thereof.

Further, because an impact delivered from the outside of the module housing 200 due to the first space 215 is delivered to the end wall 240 and the cell stack 100 in a reduced state, safety of the battery may be improved.

In addition, a proper cooling is important for the unit cell 110, which generates heat during use, and the first space 215 may provide (or advantageously serve as) a heat dissipating space in which the heat of the cell stack 100 is dispersed.

In an exemplary embodiment of the present invention, as illustrated in FIGS. 1 and 2, a plurality of receiving parts 220 may be disposed in the inner space of the module housing 200 along the first direction X, and the two receiving parts 220 adjacent to each other along the first direction X each include one of the end walls 240 which face each other in the first direction X (e.g., the second end walls 240) and may be spaced apart from each other in the first direction X to form a second space (e.g., a second impact absorbing space) 216 between the second end walls 240.

FIG. 1 illustrates the module housing 200 including four receiving parts 220, and sets of two receiving parts 220 are aligned (or arranged) in the first direction X. However, the present invention is not limited thereto, and any suitable number of receiving parts 220 may be aligned (or arranged) in the first direction X.

In the two receiving parts 220 adjacent to each other in the first direction X, the fixing wall 250 (or the end wall 240) of one receiving part 220 faces the fixing wall 250 (or the end wall 240) of the other receiving part 220, and the two receiving parts 220 have different end walls 240 that face each other (e.g., different second end walls 240 that face each other). For example, the receiving parts 220 arranged in the first direction X do not share the end walls 240.

Referring to FIG. 2, in some embodiments, the two receiving parts 220 may be arranged (or aligned) in the first direction X, the second end walls 240 may be spaced apart from each other, and the second space 216 may be formed between the second end walls 240.

The second space 216 protects the cell stack 100 inserted into the corresponding receiving part 220 from an impact delivered from the outside of the receiving part 220, much like the first space 215. For example, the first space 215 may prevent an impact delivered to the outer wall 210 of the module housing 200 from being delivered to the inner space of the module housing 200, or reduce the likelihood thereof, and the second space 216 may prevent the impact delivered to any one of the receiving parts 220 (e.g., the first receiving part 220) from being delivered to the other receiving part 220 adjacent to the first receiving part 220 (or the second receiving part 220) in the first direction X, or reduce the likelihood thereof.

Figure 9:
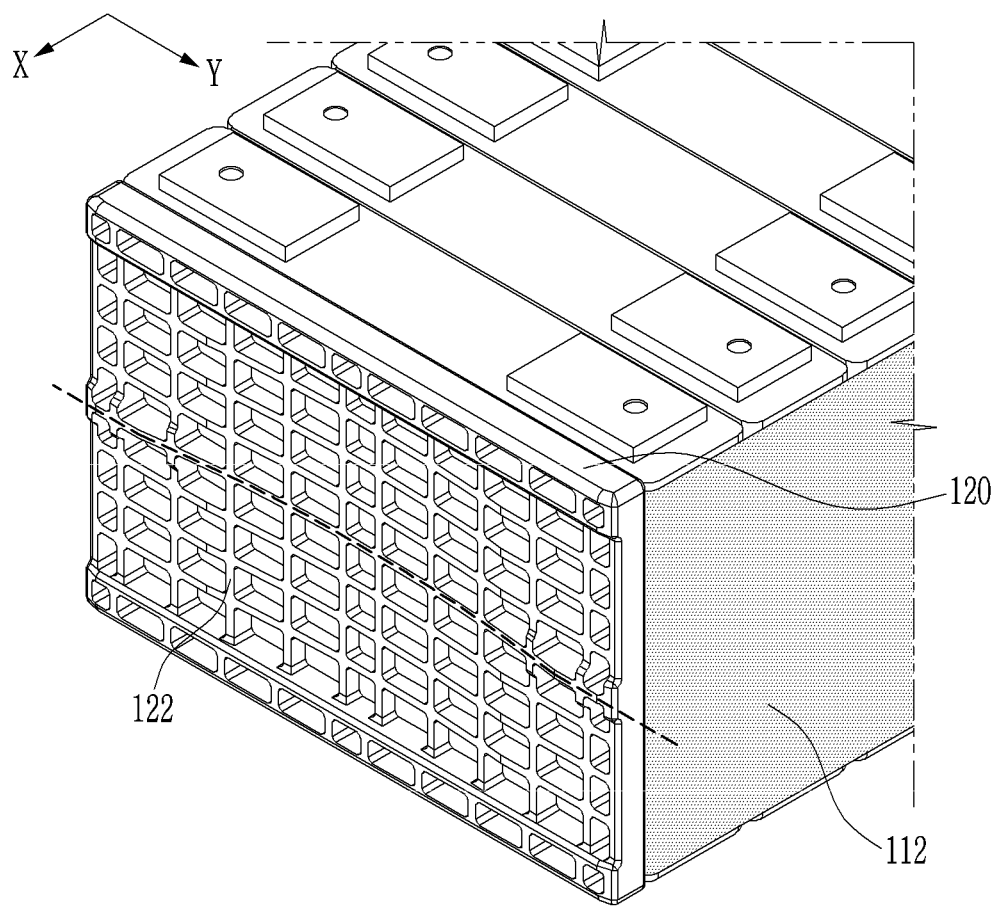
FIG. 9 is a perspective view illustrating an end surface of the end support in the battery module according to an exemplary embodiment of the present invention.

As illustrated in FIG. 2 and FIG. 7, the end support 120 may be disposed at an outer side of the outermost cell of the cell stack 100. FIG. 9 illustrates an end surface (or an outer surface) of the end support 120.

As illustrated in FIGS. 2, 7, and 9, in the battery module 1000 according to an exemplary embodiment of the present invention, the cell stack 100 may further include a pair of end supports 120 disposed at both (or opposite) end portions in the first direction X, respectively, and having the outer side surfaces corresponding to the end surfaces of the cell stack 100.

According to an exemplary embodiment of the present invention, the plurality of unit cells 110 may be provided such that at least the lateral surface is surrounded by the insulation member 112 (or the insulation member 112 is around at least the lateral surface of the plurality of unit cells 110), and the end supports 120 may be disposed in such that an interior surface (or inner surface) of each of the end supports 120 is in surface contact with the insulation member 112, at both ends of the cell stack 100 in the first direction X. However, the present invention is not limited thereto.

The end supports 120 are disposed at both ends of the cell stack 100 in the first direction X, and the exterior surfaces of the end supports 120 may correspond to end surfaces of the cell stack 100. The end support 120 may serve to absorb impact between the end wall 240 and the outermost cell, and may serve to uniformly transfer force (e.g., pressing force) of the end wall 240 to the outermost cell among the plurality of unit cells 110.

The outermost cell refers to the unit cell 100 positioned at the outermost side in the first direction X among the plurality of unit cells 110 configuring the cell stack 100, and in the exemplary embodiment of the present invention, the outermost cell is disposed at each end of the cell stack 100 in the first direction X.

Even though an entire surface of the end wall 240 may not press the end support 120 (e.g., because the end wall 240 has a bent (or curved) shape), an entire surface of the end support 120 may press the insulation member 112 and the exterior surface (or outer surface) of the outermost cell.

Figure 8:
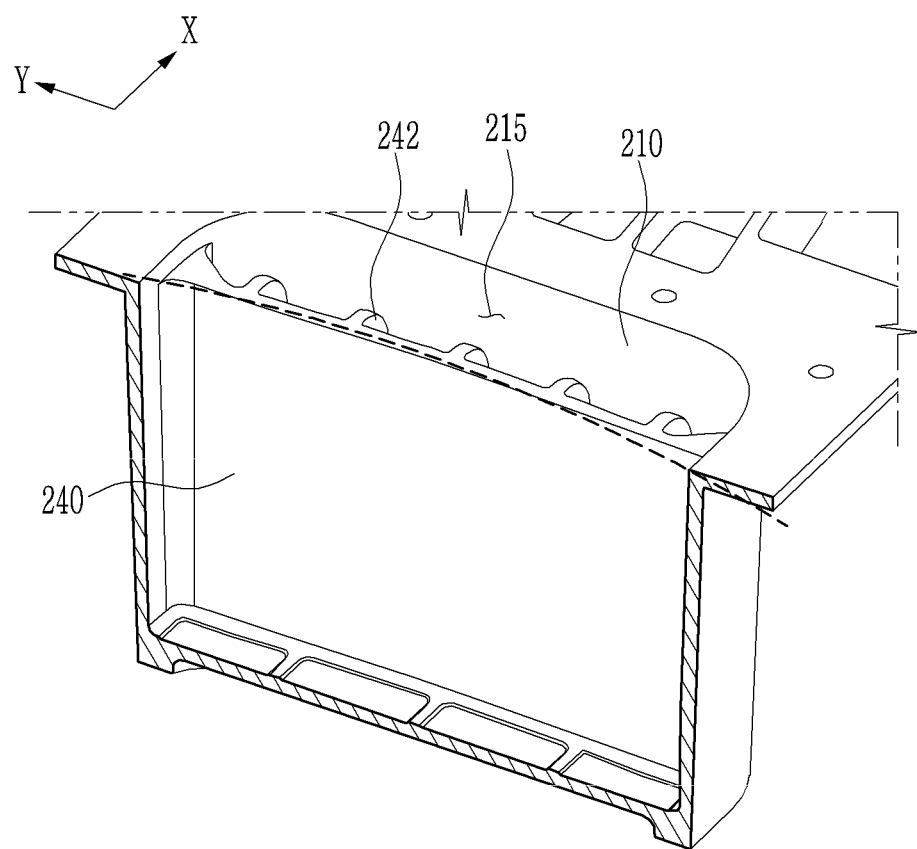
FIG. 8 is a cross-sectional perspective view illustrating the end wall in the battery module according to an exemplary embodiment of the present invention.

FIG. 7 illustrates the cross-section of the end wall 240, which is bent (or curved) so that the center portion is far from the end surface, and FIG. 8 illustrates an inner surface of the end surface of the cell stack 100 at the curved end wall 240 according to embodiments.

As shown in FIG. 7 and FIG. 8, in the battery module 1000 according to an exemplary embodiment of the present invention, the end wall 240 may be outwardly bent (or curved) so that a central portion thereof is further from the facing (or adjacent) end surface facing of the cell stack 100, thereby forming a third space 217 (e.g., a swelling space) between the end wall 240 and the end surface.

The end wall 240 may be formed in a bent (or curved) shape such that the central portion thereof is further from the end surface of the cell stack 100 inserted into the receiving part 220. The end wall 240 may be recessed only in the center part thereof with respect to the second direction Y and a third direction (e.g., a height direction), but may be provided in a bent (or curved) shape so that a cross section thereof has a recessed shape, as shown in FIG. 7.

The end wall 240 has the bent (or curved) shape so that a space is formed in (or at) at least the central portion between the end wall 230 and the end surface of the cell stack 100, and the corresponding space corresponds to the third space 217 according to an exemplary embodiment of the present invention.

In the unit cell(s) 110 constituting the cell stack 100, a swelling phenomenon may occur in which a gas is generated from an internal electrode assembly and swelled due to the endurance progress of use (e.g., repeated use) or a surrounding (or peripheral) situation (e.g., by swelling of an adjacent unit cell 110), and it is particularly important in a structure in which the plurality of unit cells 110 are aligned to implement a structure capable of appropriately coping with the swelling.

For example, when the swelling phenomenon occurs in one unit cell 110, the swelling phenomenon may occur in other unit cells 110 of the cell stack 100 including a corresponding unit cell 110. If the swelling phenomenon occurs in one unit cell 110 to increase a thickness of the unit cell 110, the whole length of the cell stack 100 may be greatly changed in view of all of a plurality of unit cells 110. Further, the length change of the cell stack 100 may be applied to the end wall 240 pressurizing the cell stack 100 in the first direction X to cause breakage.

When the swelling phenomenon occurs, the unit cells 110 have a large amount of expansion in the center portion of the lateral surface positioned in the first direction X according to a structural characteristic, and thus, in the exemplary embodiment of the present invention, the third space 217 is formed between the end wall 240 and the end surface so as to accommodate the expansion of the volume of the cell stack 100 according to the swelling when the swelling phenomenon of the cell stack 100 occurs, for example.

As described above, the cell stack 100 is engaged (e.g., pressed) in the first direction X for efficiency, such as energy density, and in the exemplary embodiment of the present invention, even though the center portion of the end wall 240, which engages (e.g., presses) the end surface, is curvedly bent, both end portions of the end wall 240 maintain the engaged state (e.g., pressed state) of the end surfaces, which assists operation of the cell stack 100.

Furthermore, as shown in FIG. 9, the end surface of the end support 120 may be indented inwardly so that the center portion of the end surface of the end support 120 is relatively far from the facing end wall 240. For example, the end support 120 may have a shape in which the center portion of the end surface is indented.

When the end support 120 is included, the end surface of the end support 120 be shaped such that the center portion of the end surface is indented, so that a space is formed in at least the center portion between the end surface of the end support 120 and the end wall 240 similar to the end wall 240 having the bent (or curved) shape, and thus the third space 217 may be formed in at least the center portion between the end support 120 and the end wall 240.

For example, a swelling phenomenon may occur in at least one of the plurality of unit cells 110, for example, a central portion of the unit cell 110 may swell or expand, and the central portion of the end support 120 presses the end wall 240 side due to the expansion of the central portions of the plurality of unit cells 110. Because the central portion of the end surface of the end support 120 has a structure recessed inwardly, even when the central portion of the end support 120 is pressed and transformed outwardly, transformation or damage of the end wall 240 may be suppressed or prevented (or the likelihood thereof may be reduced) by the third space 217 formed between the end support 120 and the end wall 240.

As illustrated in FIGS. 2 and 7, a plurality of first ribs 242 may be formed on the end wall 240 according to an exemplary embodiment of the present invention. For example, the end wall 240 may include the plurality of first ribs 242 on the outer side surface thereof with respect to (or in) the first direction X.

The end wall 240 should be robust against external impact while engaging (e.g., pressing) the end surface of cell stack 100, and further, even though the third space 217 is formed, even when a change in length of the cell stack 100 occurs beyond an accommodating range of the third space 217, the end wall 240 should have mechanical strength to prevent breakage, or reduce the likelihood thereof.

Accordingly, in an exemplary embodiment of the present invention, as illustrated in FIGS. 2 and 7, the plurality of first ribs 242 may be provided on (or at) the outer side surface of the end wall 240, e.g., the surface facing the outer wall 210, or a surface opposite to the cell stack 100.

The first ribs 242 are formed on the outer side surface of the end wall 240 to protect the cell stack 100. As used herein, the outer side surface of the end wall 240 refers to a surface facing the opposite side of the end support 120. The first ribs 242 may be separately manufactured and may be coupled to the end wall 240, or may be formed integrally on the end wall 240, for example, through a casting process.

As illustrated in FIGS. 2 and 7, the plurality of first ribs 242 may extend in the third direction (e.g., the height direction) of the end wall 240 and may be disposed to be spaced apart from each other in the second direction Y.

The first ribs 242 may extend in the third direction of the end wall 240. Accordingly, the first ribs 242 may effectively improve strength of the end wall 240 and may be formed integrally with the end wall 240, e.g., in a casting process using an upper mold and a lower mold.

Further, the plurality of first ribs 242 are provided and are disposed to be spaced apart from each other along the second direction Y, thereby implementing a uniform and stable strength improvement over the entire end wall 240. FIG. 7 illustrates cross sections of the plurality of first ribs 242 disposed to be spaced apart from each other along the second direction Y.

FIG. 9 illustrates the end support 120 having a plurality of second ribs 122 formed on the end surface thereof. As shown in FIG. 9, the end support 120 in an exemplary embodiment of the present invention may include the plurality of second ribs 122 protruding toward the end wall 240 on the end surface of the end support 120.

Because swelling force may be delivered from the plurality of unit cells 110 on the end support 120 when the swelling occurs, the end support 120 should be robust against deformation and breakage while coping with the expansion of the unit cells 110 due to the swelling phenomenon.

Accordingly, the second ribs 122 are formed on the end surface of the end support 120 to improve robustness of the end support 120. For example, an inner side surface of the end support 120, e.g., an opposite surface of the end surface, is in surface contact with the outer side surface of the outermost cell of the cell stack 100 or the insulating member 112 to secure pressurization capability, and the second ribs 122 are formed on the end surface of the end support 120.

In addition, as illustrated in FIG. 9, in an exemplary embodiment of the present invention, the second ribs 122 may be disposed to be spaced apart from each other in the second direction Y and the third direction of the end support 120 to form a lattice shape.

Referring to FIG. 9, in an exemplary embodiment of the present invention, the second ribs 122 may be formed to cross substantially the entire end surface along an extending direction, and some of the plurality of second ribs 122 may extend in the second direction Y and the remainder thereof may extend in the third direction of the end support 120, such that the plurality of second ribs 122 may be disposed to form a lattice shape.

For example, a plurality of second ribs 122 may be spaced apart from each other in the second direction Y or the third direction of the end support 120 so as to form a lattice shape, which may effectively improve strength of the end support 120.

According to embodiments, substantially square-shaped grooves may be disposed in a lattice form on the end surface of the end support 120, and the second ribs 122 may be separately manufactured and coupled to the end surface of the end support 120, or may be formed integrally when the end support 120 is manufactured.

In an exemplary embodiment of the present invention, the fixing wall 250 of any one of the receiving parts 220 may be defined as including the separation wall 230, the pair of end walls 240, and a portion of the outer wall 210, and the separation wall 230 and the end walls 240 may be formed integrally, for example, through a casting process or the like.

In addition, as illustrated in FIG. 2, in an exemplary embodiment of the present invention, one surface of the four surfaces of the fixing wall 250 may correspond to the separation wall 230, two other surfaces may correspond to the end walls 240, respectively, and the remaining surface may constitute the outer wall 210 of the module housing 200.

In the battery module 1000 according to an exemplary embodiment of the present invention, the module housing 200 may have the bottom surface 260 formed integrally with the end walls 240, the separation wall 230, and the outer wall 210, e.g., through the casting process.

For example, in an exemplary embodiment of the present invention, the end walls 240 and the separation wall 230 may be formed integrally with the module housing, and engraving (or intaglios) of the end wall 240 and the separation wall 230 may be integrally formed in the mold when the mold is manufactured for the casting process.

In addition, in an exemplary embodiment of the present invention, the end walls 240 and the separation wall 230 may be formed integrally with the outer wall 210 of the module housing 200. For example, the outer wall 210, the separation wall 230, the end walls 240, and the bottom surface 260 of the module housing 200 may be all manufactured (or formed) integrally.

As described above, a manufacturing process where a module housing 200 including the end wall 240 and the separation wall 230, which are integrally formed, an additional manufacturing process for including the end wall 240 and the separation wall 230 may be omitted. As described above, although a module frame is omitted by the end wall 240 and the separation wall 230, the cell stack 100 of the present invention may fix (e.g., stably fix) a plurality of unit cells 110 inside the receiving part 220 in a pressed state.

Figure 10:
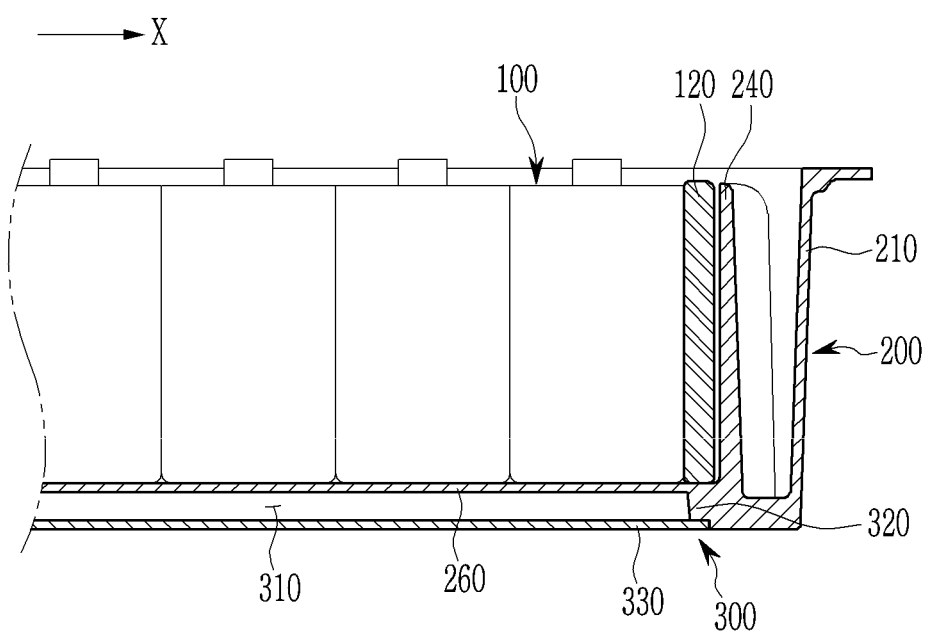
FIG. 10 schematically illustrates a cooling channel in the battery module according to an exemplary embodiment of the present invention.
Figure 11:
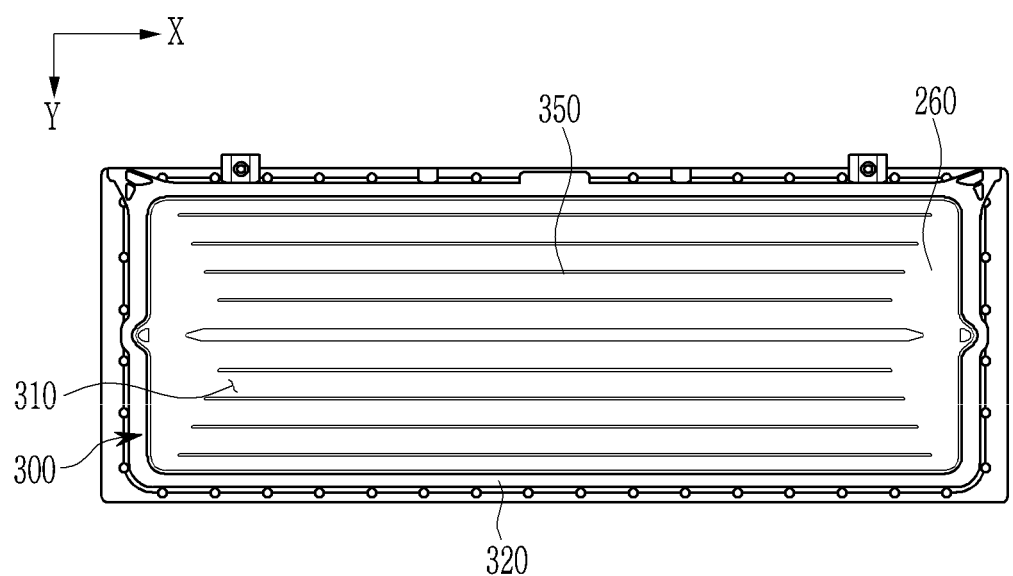
FIG. 11 is a bottom view of the cooling channel in the battery module according to an exemplary embodiment of the present invention.

FIG. 10 illustrates a cross-section of the module housing 200 according to an exemplary embodiment of the present invention, and illustrates a cooling channel 300 having a flow space 310, in which coolant flows, formed under the bottom surface 260 of the module housing 200. FIG. 11 illustrates the cooling channel 300 viewed from the bottom side.

As illustrated in FIG. 10, in the battery module 1000 according to the exemplary embodiment of the present invention, the module housing 200 may be formed with the cooling channel 300, through which coolant flows, under the bottom surface 260. Further, a plurality of guide ribs (or guide protrusions) 350 extending in a flowing direction of the coolant and guiding a flow of the coolant, may be provided on a lower surface of the bottom surface 260, as illustrated in FIG. 11.

The flow space 310 of the cooling channel 300 may be formed throughout an entirety of the bottom surface 260, or may be formed to correspond to a cross-sectional area of the internal space of the module housing 200, in which the receiving part 220 is formed. For example, the cooling channel 200 may be designed such that the flow space 310 is not formed below the first space 215. The coolant flows inside the cooling channel 300, and various refrigerants, such as air or cooling water, may also be used.

The unit cell 110 configuring the cell stack 100 corresponds to a heating body emitting heat at the time of the discharge, and when a temperature of the unit cell 110 is excessively increased, the swelling phenomenon may be induced or heat may be increased (e.g., rapidly increased) through a rapid chemical reaction, so that a thermal runaway phenomenon generating fire and the like may be generated.

Further, when the cell stack 100, in which the plurality of unit cells 110 is arranged, is used like the exemplary embodiment of the present invention, when the thermal runaway phenomenon is generated in any one unit cell 110, a thermal runaway dispersion phenomenon influencing another peripheral unit cell 110 may be generated.

When the plurality of unit cells 110 is disposed as described above, it is important to approximately cool heat generated in the cell stack 100, and thus, the battery module 1000 according to an exemplary embodiment of the present invention includes the cooling channel 300 under the bottom surface 260 of the module housing 200 and may efficiently implement cooling of each (or all) of the plurality of cell stacks 100.

Further, in the exemplary embodiment of the present invention, the cooling channel 300 is formed under the bottom space 260 of the module housing 200, e.g., in the space divided from the internal space of the module housing 200, as opposed to the inside of the module housing 200, so that it is possible to more easily repair and manage the cooling channel 300. For example, according to an exemplary embodiment of the present invention, when a module cover of the module housing 200 is assembled, it is possible to easily repair and manage the cooling channel 300 at a lower portion of the module housing 200.

In the battery module 1000 according to an exemplary embodiment of the present invention, the lateral wall 320 of the cooling channel 300 protrudes from the bottom surface 260 in a downward direction (or a direction opposite to the third direction), extends along a border of the bottom surface 260, and is formed to surround the bottom surface 260, and a channel cover 330 is coupled to a lower end of the lateral wall 320 to seal the cooling channel 300.

Further, the lateral wall 320 of the cooling channel 300 may be integrally formed with the bottom surface 260 of the module housing 200, e.g., through the cast process, and the channel cover 330 may be welded and coupled to the lateral wall 320 of the cooling channel 300.

FIG. 10 illustrates the lateral wall 320 of the cooling channel 300 extending along the border of the bottom surface 260 of the module housing 200 and surrounding the bottom surface 260, and protruding from the bottom surface 260 in the downward direction.

For example, in an exemplary embodiment of the present invention, the lateral wall 320 of the cooling channel 300 is integrally formed with the bottom surface 260 of the module housing 200, e.g., through the cast process, so that a coupling region between the lateral wall 320 and the bottom surface 260 is not needed (or does not exist), and thus, it is possible to prevent the coolant from unintentionally leaking into the module housing 200, or to reduce the likelihood thereof.

The channel cover 330 sealing the cooling channel 300 may be coupled to the lateral wall 320 of the cooling channel 300 by any suitable method, such as welding, and a border of the channel cover 330 may be coupled to the lower end of the lateral wall 320.

Any suitable coupling method may be utilized, and a gasket may be provided or welded for preventing leakage of the coolant, or reducing the likelihood thereof. FIG. 11 illustrates the cooling channel 300 viewed from the bottom side with the channel cover 330 removed.

In an exemplary embodiment of the present invention, a side wall 320 of the cooling channel 300 protrudes downward from the bottom surface 260 of the module housing 200. An open lower portion of the cooling channel 300 is coupled to the channel cover 330 to form a closed cooling channel 300. Danger in an operation of the cell stack 100 due to leakage of cooling water in the cooling channel 300 may be efficiently reduced by forming the cooling channel 300 at an outside of the module housing 200.

Further, the outer wall 210 and the bottom surface 260 of the module housing 200 and the side wall 320 of the cooling channel 300 may all be formed integrally, e.g., through the casting process, such that there is no portion through which the cooling water may leak, and further, because the cooling channel 300 is provided below the bottom surface 260 of the module housing 200, e.g., to the outside of the inner space of the module housing 200, it is possible to prevent a situation in which the cooling water leaks into the inner space of the module housing 200 in which the cell stacks 100 are located, even when there is leakage of the cooling water generated (e.g., unintentionally generated) in the cooling channel 300.

As such, according to an exemplary embodiment of the present invention, because the plurality of cell stacks 100 are inserted, the assembly process and components may be simplified, high power demand may be effectively satisfied, the plurality of cell stacks 100 may be effectively cooled through the cooling channel 300, and the plurality of cells stacks 100 may be effectively protected from a leakage phenomenon of the cooling water, which may be caused in the cooling channel 300.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

| Description of some of the symbols | |
| --- | --- |
| 100: cell stack | 110: unit cell |
| 120: end support | 122: second rib |

-continued

| Description of some of the symbols | |
|---|---|
| 200: module housing | 210: outer wall of module housing |
| 211: first wall | 212: second wall |
| 215: first space | 216: second space |
| 220: receiving part | 230: separation wall |
| 240: end wall | 242: first rib |
| 250: fixing wall | 260: bottom surface of module housing |
| 300: cooling channel | 310: flow space |
| 320: side wall of cooling channel | 330: channel cover |
| 350: guide protrusion | 400: coupling part |
| 410: fastening part | 415: fastening member |
| 420: guide part | 422: guide pin |
| 424: guide groove | 430: connection part |
| 432: connection tube | 434: tube receiving opening |
| 436: bus bar | 438: connection line |
| 1000: battery module | 1001: adjacent battery module |

What is claimed is:

1. A battery module comprising:
a plurality of cell stacks, each of the cell stacks comprising:
a plurality of unit cells arranged in a first direction; and
an insulating member around the plurality of unit cells; and
a plurality of module housings, each of the module housings comprising:
a plurality of receiving parts, a receiving part of the plurality of receiving parts receiving a cell stack of the plurality of cell stacks; and
a coupling part,
wherein the receiving part comprises a fixing wall around the cell stack, at least a portion of the fixing wall contacting the cell stack,
wherein the fixing wall comprises end walls at respective sides of the receiving part in the first direction to engage end surfaces of respective sides of the cell stack in the first direction,
wherein the coupling part is at a first wall and a second wall around an inner space of the respective module housing, the first wall and the second wall arranged along a second direction perpendicular to the first direction,
wherein the coupling part at the second wall of a first module housing from among the plurality of module housings is configured to be coupled to the coupling part at the first wall of a second module housing from among the plurality of module housings that is adjacent to the first module housing in the second direction,
wherein each of the coupling part of the first module housing and the coupling part of the second module housing comprises a fastening part and a connection part,
wherein the fastening part of the second module housing is configured to be fastened to the fastening part of the first module housing through a fastening member,
wherein the connection part at the first wall of the second module housing protrudes from the first wall of the second module housing in the second direction so as to face the second wall of the first module housing and is configured to be connected to the connection part at the second wall of the first module housing, and
the connection part of the first module housing and the connection part of the second module housing are connection passages of a bus bar.

2. The battery module of claim 1,
wherein the fastening part comprises fastening parts at the first wall and the second wall, respectively, and
wherein the fastening part at the first wall of the second module housing is configured to be fastened to the fastening part at the second wall of the first module housing through a fastening member.

3. The battery module of claim 2, wherein the coupling part of the second module housing comprises
guide pins on the first wall and protruding in the second direction,
and wherein the coupling part of the first module housing comprises guide grooves on the second wall and configured to receive the guide pins of the second module housing.

4. The battery module of claim 3, wherein the connection part of the second module housing comprises a connection tube that defines a connection tunnel at the first wall, and protruding in the second direction, the connection tunnel having a hollow in which the bus bar is led from the inside of the module housing, and
wherein the connection part of the first module housing comprises a tube receiving opening on the second wall and configured to receive the connection tube of the second module housing and the bus bar.

5. The battery module of claim 4,
wherein the fastening parts are at opposite end portions of the first wall and the second wall in the first direction,
wherein the connection tube and the tube receiving opening are at central portions of the first wall or the second wall,
wherein a guide pin of the guide pins is between the fastening part and the connection tube, and
wherein a guide groove of the guide grooves is between the fastening part and the tube receiving opening.

6. The battery module of claim 1,
wherein a module housing of the plurality of module housings further comprises a separation wall extending in the first direction and partitioning an inner space defined by an outer wall of the module housing to form adjacent ones of the plurality of receiving parts, and
wherein the separation wall corresponds to a part of the fixing wall of each of the receiving parts along the second direction, and
wherein the separation wall contacts a side surface of the cell stack received in the respective receiving part.

7. The battery module of claim 6,
wherein the end walls comprise a first end wall and a second end wall, and
wherein the first end wall faces the outer wall of the module housing and is spaced apart from the outer wall along the first direction, defining a first impact absorbing space between the first end wall and the outer wall.

8. The battery module of claim 7,
wherein a first receiving part and a second receiving part from among the plurality of receiving parts are arranged along the first direction at the inner space of the module housing, and
wherein the second end walls of the first receiving part and the second receiving part are spaced apart from each other and face each other, defining a second impact absorbing space between the second end walls of the first and second receiving parts.

9. The battery module of claim 7, wherein the cell stack further comprises a pair of end supports at opposite end portions thereof in the first direction and having outer side surfaces corresponding to the end surfaces.

10. The battery module of claim 9, wherein the end walls are curved outwardly such that central portions thereof are located further from the end surfaces than other portions of the end walls, and the end surfaces are recessed inwardly such that central portions thereof are away from the end walls facing each other, defining a third space.

11. The battery module of claim 10, wherein the end wall comprises a plurality of first ribs, the plurality of first ribs protruding to an outer side surface in the first direction, being spaced apart from each other in the second direction, and extending in a third direction.

12. The battery module of claim 11, wherein the end support comprises a plurality of second ribs, the plurality of second ribs protruding to the end wall at the end surface, and being spaced apart from each other in the second direction and the third direction in a lattice shape.

13. The battery module of claim 1, wherein the module housing comprises a cooling channel under a bottom surface of the module housing, the cooling channel configured to accommodate a flow of coolant.

14. The battery module of claim 13, wherein a side wall of the cooling channel is integral with the bottom surface of the module housing.

* * * * *